United States Patent
Hamrick et al.

(10) Patent No.: US 9,223,786 B1
(45) Date of Patent: Dec. 29, 2015

(54) COMMUNICATION IN A SENSORY IMMERSIVE MOTION CAPTURE SIMULATION ENVIRONMENT

(75) Inventors: Cameron Travis Hamrick, Marietta, GA (US); Nels Howard Madsen, Auburn, IL (US); Thomas Michael McLaughlin, Miramar Beach, FL (US)

(73) Assignee: Motion Reality, Inc., Marietta, GA (US)

( * ) Notice: Subject to any disclaimer, the term of this patent is extended or adjusted under 35 U.S.C. 154(b) by 297 days.

(21) Appl. No.: 13/421,427

(22) Filed: Mar. 15, 2012

Related U.S. Application Data

(60) Provisional application No. 61/452,806, filed on Mar. 15, 2011.

(51) Int. Cl.
*G06F 3/0481* (2013.01)
*G06F 17/30* (2006.01)

(52) U.S. Cl.
CPC ........ *G06F 17/30056* (2013.01); *G06F 3/0481* (2013.01); *A63F 2300/1012* (2013.01)

(58) Field of Classification Search
CPC ................. A63F 2300/1012; G06F 17/30056; G06F 3/0481

USPC ......... 434/308, 11–72; 715/705–711; 463/31, 463/35–36, 39
See application file for complete search history.

(56) References Cited

U.S. PATENT DOCUMENTS

| | | | |
|---|---|---|---|
| 7,409,639 B2 * | 8/2008 | Dempski et al. ............... | 715/705 |
| 2006/0029243 A1 * | 2/2006 | Gerrard et al. ................ | 381/310 |
| 2011/0021273 A1 * | 1/2011 | Buckley et al. ................. | 463/31 |
| 2012/0139828 A1 * | 6/2012 | Lok et al. ...................... | 345/156 |

* cited by examiner

*Primary Examiner* — Timothy A Musselman
(74) *Attorney, Agent, or Firm* — King & Spalding LLP

(57) ABSTRACT

A participant in a capture volume can speak through a microphone. The microphone can capture the speech and transmit it to a wearable computing device of the participant. The wearable computing device can process the speech to generate audio data. The wearable computing device can transmit the audio data to a simulator engine. The simulator engine can receive the audio data and processes the audio data to determine an attribute of the audio data (e.g., amplitude) at the location of a virtual character in a simulated virtual environment based on one or more attenuation factors. The attenuation factors can be calculated based on 3D motion data of the participant. Further, the simulator engine can drive an change in state of the virtual character in the simulated virtual environment based on the attribute of the audio data.

26 Claims, 15 Drawing Sheets

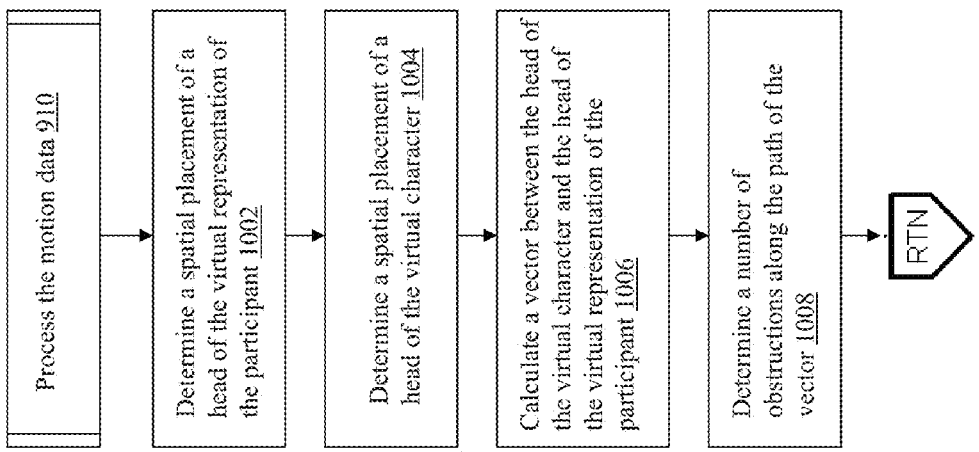

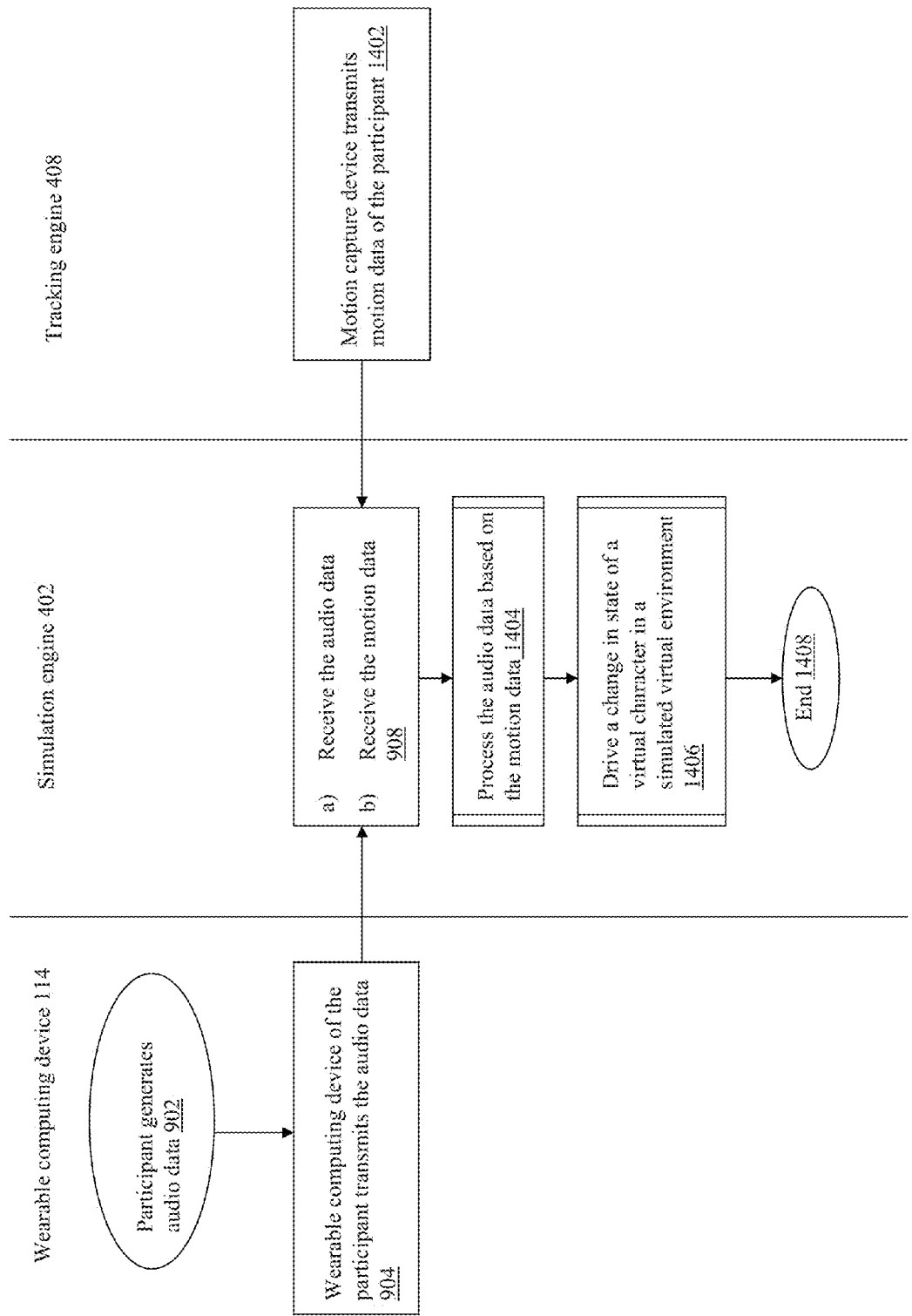

COMMUNICATION IN A SENSORY IMMERSIVE MOTION CAPTURE SIMULATION ENVIRONMENT

CROSS REFERENCE TO RELATED APPLICATIONS

This application claims priority to U.S. Provisional Patent Application No. 61/452,806 filed Mar. 15, 2011 in the name of Cameron Travis Hamrick, Nels Howard Madsen, and Thomas Michael McLaughlin and entitled "AI—Speech for a Sensory Immersive Motion Capture Simulation System," the entire contents of which are hereby incorporated herein by reference.

FIELD OF INVENTION

This disclosure relates generally to a technical field of simulation systems and, in one example embodiment, to a system, method and an apparatus for communication in a sensory immersive motion capture simulation environment.

BACKGROUND

Training in realistic situations often yields substantial performance improvement. However, with conventional technology such realistic training can pose high risk to the training participant, especially if the training involves performance of potentially dangerous tasks or operations in hostile and/or potentially threatening environments. Further, training in realistic situations can be cost intensive.

Simulating a realistic situation can provide a reduced risk training capability to the participant. However, simulations often have a suspension of disbelief barrier due various reasons such as technical or hardware limitations. The suspension of disbelief barrier can cause a realism of the simulation to be compromised, thereby causing the participant be un-immersed in the simulation. Further, the suspension of disbelief barrier can cause a performance improvement of the participant to be below par as compared to training in the realistic situations, because the participant is un-immersed in the simulation. Thus, there is a need for a technology that reduces the suspension of belief barrier in simulation systems.

SUMMARY

A sensory immersion motion capture simulation system can facilitate creating believable virtual characters in the sensory immersion motion capture simulation environment. The virtual characters can recognize the same types of sensory input its physical counterpart recognizes, and then adapt its behavior in response to a combination of the cues derived from the sensory input in a believable manner. When virtual characters respond to the participant's intentional or unintentional sensory cues, the barriers to the participant's suspension of disbelief barrier may be reduced. One of the most meaningful sensory cues a simulated character can receive from a participant may be the participant's vocal data. With or without lexical or semantic understanding, many social and cultural cues about the interaction between people can be derived from hearing another person speak.

The term "sensory immersion motion capture simulation system," as used herein, generally refers to a simulation system that provides immersion into a virtual reality environment whereby a participant's movements and/or actions are immediately and accurately translated into corresponding movements and/or actions of the virtual representation of the participant (avatar). A sensory immersion experience may generally refer a participant's experience where the participant's mind perceives a simulated virtual environment as if it were real and/or further interacts with the simulated virtual environment as if it were the real world. The term "sensory immersion motion capture simulation environment," can generally refer to any simulated environment (e.g., virtual world) that can provide a sensory immersion experience to a participant.

The term "virtual character," as used herein, generally refers to a simulated character that is computer generated and computer controlled. In one embodiment, the virtual character can be a software representative of a simulated character. In some embodiments, a prerecorded virtual representation of the participant from a previous simulation can be used as virtual characters in a current simulation.

Disclosed are a system, a method and an apparatus for communication in a sensory immersive motion capture simulation environment. In one aspect of the present invention, a method can include driving the action of a virtual character in a simulated virtual environment based on participant audio data with high fidelity 3D motion data of a participant provided by real time motion capture in a capture volume. The method can include receiving, by a simulator engine, an audio data of a participant in the capture volume. The audio data of the participant in the capture volume can be translated to audio data of the virtual representation of the participant in the simulated virtual environment. The audio data can include a sampled sound and/or phrases corresponding to a sound and/or speech of a participant in the capture volume. The sound and/or speech of a participant in the capture volume can be captured through a microphone. The captured sound and/or speech of the participant can be processed by a wearable computing device of the participant to generate the audio data. The wearable computing device can transmit the audio data to the simulator engine.

The method can further include processing, by the simulator engine, the audio data to determine an attribute of the audio data at a location of a virtual character in the simulated virtual environment based on a set of attenuation factors. The attribute of the audio data can include intent of the participant, audio characteristics, a recipient of the audio data and/or a sender of the audio data. The audio characteristics can further include, but is not limited to amplitude, frequency and tone of the sound. The attenuation factors can include a distance between the virtual representation of the participant and the virtual character in the simulated virtual environment and/or a number of obstructions between the virtual representation of the participant and the virtual character in the simulated virtual environment. The distance between the virtual representation of the participant and the virtual character in the simulated virtual environment can refer to a distance between the heads of the virtual representation of the participant and the virtual character in the simulated virtual environment. Similarly, the number of obstructions between the virtual representation of the participant and the virtual character in the simulated virtual environment can refer to the number of obstructions between the heads of the virtual representation of the participant and the virtual character in the simulated virtual environment. The attenuation factors can be calculated based on a 3D motion data of the participant in a capture volume. The 3D motion data of the participant can include, but is not limited to, a position, an orientation and/or a velocity of motion of the head of a participant in the capture volume. The simulator engine can receive the 3D motion data of the participant from either a motion capture device that captures a movement and/or action of a participant in the capture volume or a tracking device.

The method can further include driving, by the simulator engine, an action of the virtual character in the simulated virtual environment based on the audio data when the attribute of the audio data at the location of the virtual character matches a preset condition. Further, the action of the virtual character can be driven based on a phrase corresponding to a speech of the participant. For example, the participant approaches a simulated character and says "Take three steps back!" (In the simulated virtual environment it appears as if the participant's avatar says "Take three steps back!" to the virtual character.) The wearable computing device processes the speech and transmits an audio data comprising the phrase "TAKE THREE STEPS BACK". The simulator engine drives the action of the virtual character based on the phrase such that the virtual character backs up three steps in the simulated virtual environment. The term "phrase," as used herein, generally refers to a group of words, character string and/or a word. The term "speech," as used herein, generally refers to communication by speaking, utterances, spoken language, a vocalized form of human communication and/or a particular way of speaking.

The methods, systems and apparatuses disclosed herein may be implemented in any appropriate means for achieving various aspects, and may be executed in a form of a machine-readable medium embodying a set of instructions that, when executed by a machine, cause the machine to perform any of the relevant operations disclosed herein. These and other aspects, features and advantages of the present invention may be more clearly understood and appreciated from a review of the following detailed description of the disclosed embodiments and by reference to the appended drawings and claims.

BRIEF DESCRIPTION OF THE DRAWINGS

Example embodiments are illustrated by way of example and not limitation in the figures of accompanying drawings, in which:

FIG. 10 illustrates a flow chart that depicts a method of the position module, according to one or more exemplary embodiments.

FIG. 14 illustrates a flow chart of a method of communication in a sensory immersion motion capture simulation environment, according to one or more exemplary embodiments.

Figure 1:
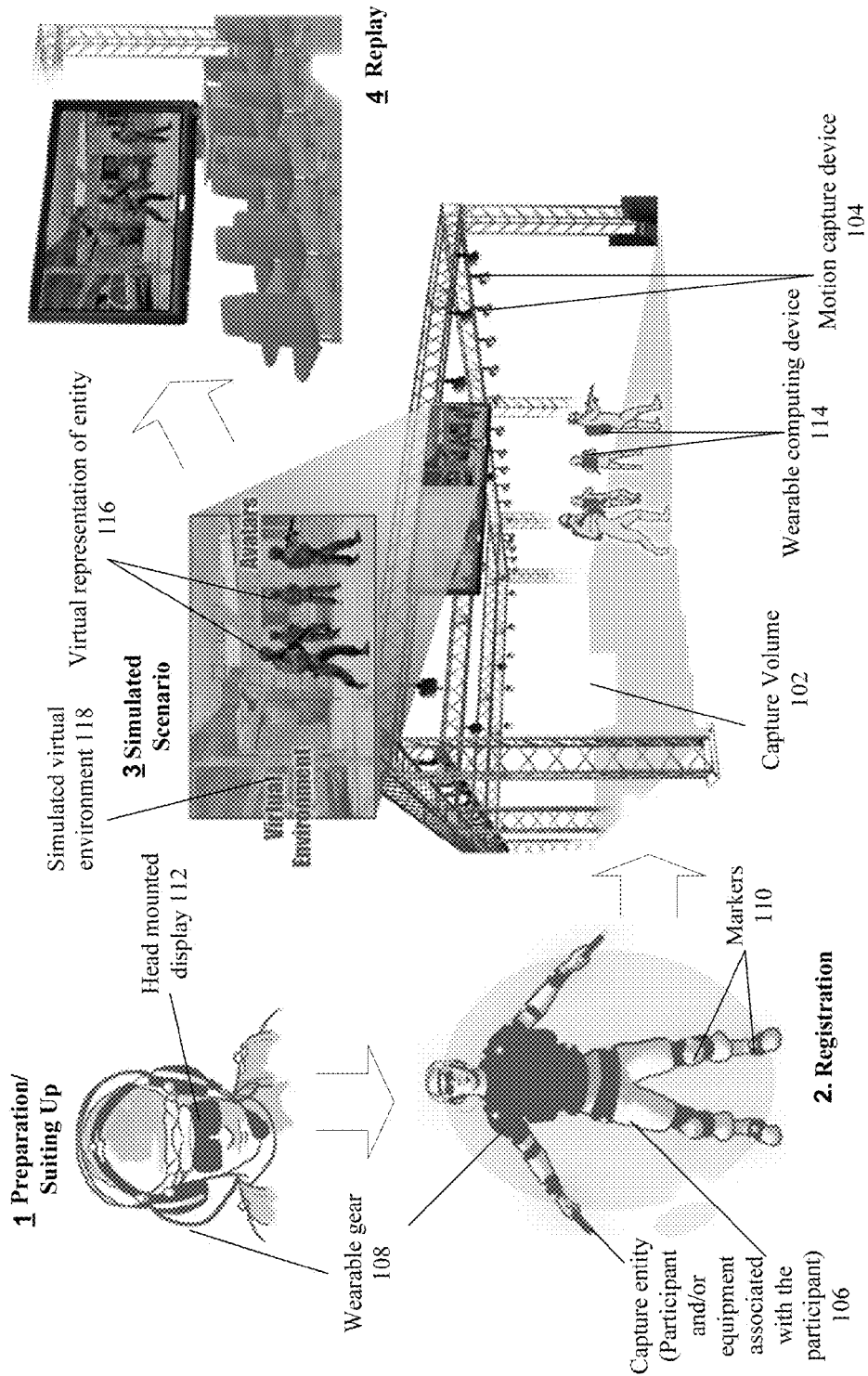
FIG. 1 illustrates a sensory immersive motion capture simulation system, according to one or more exemplary embodiments.

Many aspects of the invention can be better understood with reference to the above drawings. The elements and features shown in the drawings are not to scale, emphasis instead being placed upon clearly illustrating the principles of exemplary embodiments of the present invention. Moreover, certain dimensions may be exaggerated to help visually convey such principles. In the drawings, reference numerals designate like or corresponding, but not necessarily identical, elements throughout the several views. Other features of the present embodiments will be apparent from accompanying text, including the Detailed Description that follows.

DETAILED DESCRIPTION

Disclosed are a system, a method and an apparatus for communication in a sensory immersive motion capture simulation environment. It will be appreciated that the various embodiments discussed herein need not necessarily belong to the same group of exemplary embodiments, and may be grouped into various other embodiments not explicitly disclosed herein. In the following description, for purposes of explanation, numerous specific details are set forth in order to provide a thorough understanding of the various embodiments.

FIG. 1 illustrates a sensory immersive motion capture simulation system, according to one or more exemplary embodiments. In particular, FIG. 1 illustrates a capture volume 102, a motion capture device 104, a capture entity 106, a wearable gear 108, markers 110 coupled to the wearable gear 108, a head mounted display device (hereinafter "HMD" device) 112, a wearable computing device 114, a simulated virtual environment 118 and a virtual representation of an entity (hereinafter "capture entity's avatar") 116.

In one embodiment, a sensory immersive motion capture simulation system 100 (hereinafter "motion capture simulation system") can provide a near real-time sensory immersion of a capture entity 106 into a three dimensional simulated virtual environment 118 (hereinafter "simulated virtual environment" 118). A sensory immersion experience can be characterized as a user's experience where the user's mind perceives a simulated virtual environment substantially as if it were real and/or interacts with the simulated virtual environment substantially as if it were the real world.

In the simulated virtual environment 118, the capture entity 106 can be represented by an avatar 116. Using a capture and simulation unit 202 (shown in FIG. 2), the motion capture simulation system 100 can characterize movements and/or actions of the capture entity 106 with high fidelity. Further, the movements and actions of the capture entity 106 can be nearly immediately and accurately translated into corresponding movements and actions of the capture entity's avatar 116 in the simulated virtual environment 118. For example, when a capture entity 106 walks in the capture volume 102, nearly simultaneously the capture entity's avatar walks in the simulated virtual environment 118 based on the capture entity's 106 walking motion that is captured using the capture and simulation unit 202. Similarly, when the capture entity 106 crawls in the capture volume 102, nearly simultaneously the capture entity's avatar crawls in the simulated virtual environment 118 based on the capture entity's 106 crawling motion that is captured using the capture and simulation unit 202. In one embodiment, movement and/or action of a capture entity 106 in the space represented by the capture volume 102 can be recorded and/or captured using the motion capture device 104 of the capture and simulation unit 202. The capture and simulation unit 202 and the motion capture device 104 are described in further detail below, in connection with FIG. 2 and FIG. 4.

In one embodiment, the capture entity 106 can be any object in the capture volume 102 that is motion captured into the simulated virtual environment 118 using a motion capture device 104. In one embodiment, the capture entity 106 can be a living being (participant), such as a human being. In another embodiment, the capture entity 106 can be both a participant and an equipment (weapon, racket, wand, stick, etc.) associated with the participant, such as a weapon held by a human being. In another embodiment, the capture entity 106 can be ammunition and/or a model of the ammunition carried by the living being. In yet another embodiment, the capture entity 106 can be any physical or mechanical body including a physical prop in the capture volume 102.

In one embodiment, the simulated virtual environment 116 can contain a number of avatars. In one embodiment, each avatar of the number of avatars can represent one or more capture entities respectively. The motion of the capture entity's avatar 116 in the simulated virtual environment 118 can be driven based on the motion of the capture entity 106 in the capture volume 102 that is captured using the motion capture device 104. Further, the capture volume can include one or more virtual characters along with the avatars.

In one embodiment, the simulated virtual environment 118 can contain a custom designed virtual universe that includes any objects (e.g., props, scenery, etc.) that associated with the events or situations being simulated. For example, the virtual universe can represent a village, an urban city, a jungle, etc including the appropriate objects such as huts, trees, etc. The virtual universe can provide a context in which the avatars 116a-n can exist and interact.

In one embodiment, a motion capture device 104 in the capture volume 102 can capture the movement and/or actions of the capture entity 106 (hereinafter "motion data"). In one embodiment, the motion data can be a motion attribute of the capture entity 106. In one embodiment, when the capture entity 106 is a participant, the motion data can include, inter alia, a position, an orientation and/or a velocity of movement of the participant's head. When the capture entity 106 is an ammunition and/or a model of the ammunition, the motion attribute can include inter alia, a position, an orientation and/or a velocity of movement of the ammunition and/or a model of the ammunition. In one embodiment, the motion data can include a position of the participant's head, an orientation of the participant's head, a velocity of movement of the participant's head, a position of the object associated with the participant (e.g., gun), an orientation of the object associated with the participant (e.g., gun), and/or a velocity of movement of the object associated with the participant (e.g., gun).

Figure 4:
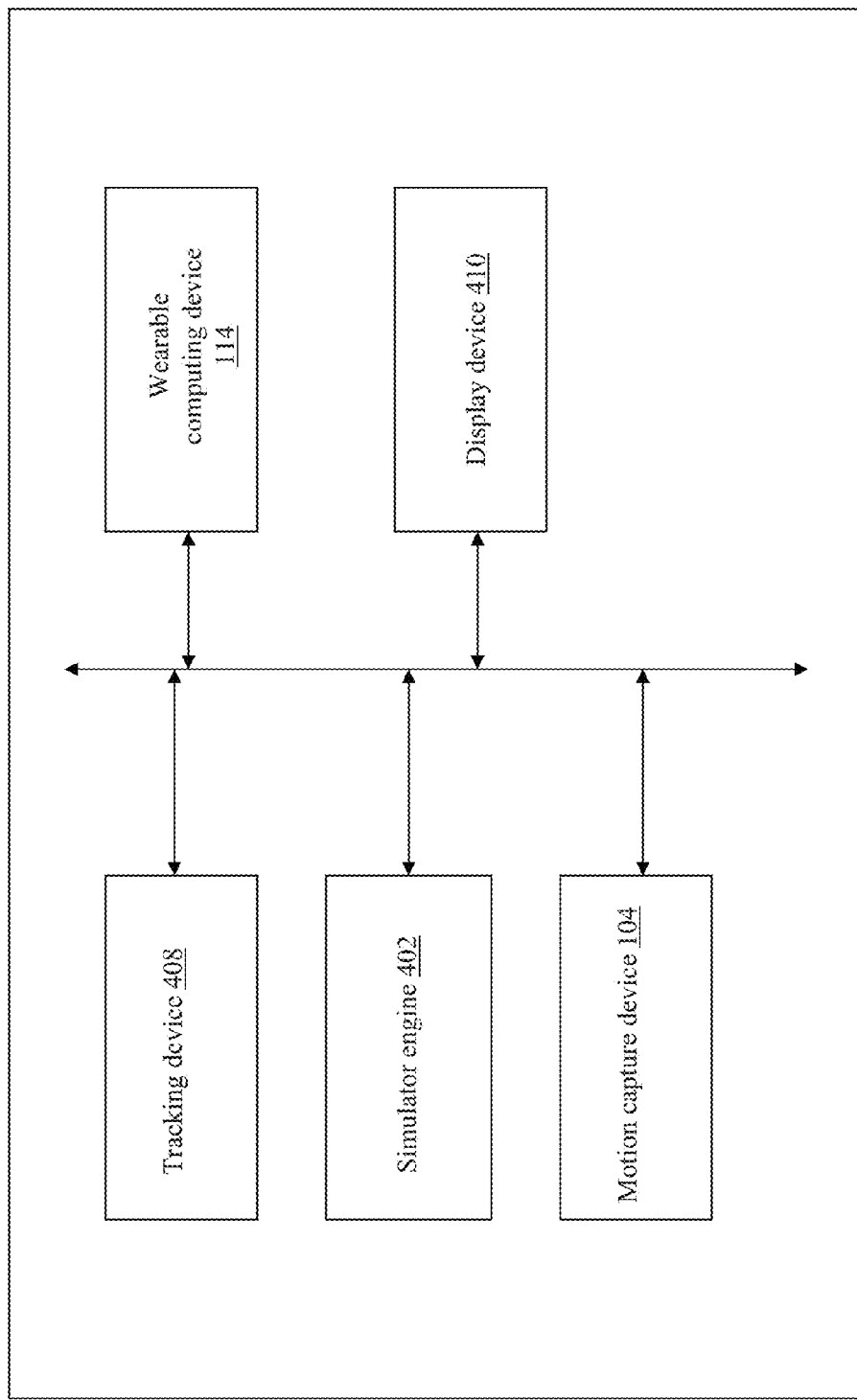
FIG. 4 illustrates a block diagram of the capture and simulation unit of FIG. 2, according to one or more exemplary embodiments.

The motion capture device 104 can transmit the motion data to a simulator engine 402 (shown in FIG. 4). The motion data of the capture entity 106, along with other capture entity-specific information such as sound and physiological data, can be used by the simulator engine to control the behaviors and/or interactions between objects and avatars in the simulated virtual environment 118. The simulator engine 402 can manage the immersion of the capture entity 106 into the virtual environment by providing visual, auditory, tactile, and/or olfactory feedback to the capture entity 106 in near real time. The simulator engine 402 is described in greater detail below, in association with FIG. 4.

In one embodiment, the visual feedback can be provided to an HMD 112 worn by the capture entity 106. The visual feedback can drive a 1st person stereoscopic point of view (POV) display provided for the capture entity 106 via an HMD 112. The audio feedback can be managed by providing a surround-sound effect through individual headphones and/or a general multi-speaker sound system. Tactile and olfactory feedback can be provided through respective devices associated with the capture entity 106. The feedback loop created by the capture entity's interaction with the data processed by and/or emanating from the simulator engine provides an immediate and tactile experience drawing the capture entity 106 into a feeling that the experience is real (e.g., sensory immersive experience).

In one embodiment, the motion capture simulation system 100 includes a capture volume 102. In one embodiment, the capture volume 102 can be a large room and/or any appropriate volume of space that is monitored by the motion capture device 104 of the capture and simulation unit 202. In one embodiment, the capture volume 102 may include one or more motion capture devices to provide a three dimensional (3D) image and/or recording of the capture volume 102 that includes the capture entity 106. The one or more motion capture devices can be distributed in the capture volume 102 in such a way that it can scan the entire volume of space represented by the capture volume 102. The one or more motion capture devices can three dimensionally capture the volume of space represented by the capture volume. In one embodiment, the capture volume 102 can accommodate one or more capture entities. In one embodiment, the one or more capture entities can participate together in a simulated scenario in the simulated virtual environment 118 through each capture entity's avatar. In one embodiment, the position and orientation of the capture entity's avatar relative to another capture entity's avatar in the simulated virtual environment 118 can correspond to the position and orientation of the capture entity relative to the other capture entity in the capture volume 102. For example, if capture entity A is to the left of capture entity B in the capture volume, then the position and orientation of capture entity A's avatar is to the left of capture entity B's avatar in the simulated virtual environment. In another embodiment, the position and orientation of the capture entity's avatar relative to another capture entity's avatar in the simulated virtual environment 118 can be offset by a predefined value compared to the position and orientation of the capture entity relative to the other capture entity in the capture volume 102. For example, if capture entity A is to the left of capture entity B in the capture volume, then in the simulated virtual environment, capture entity A's avatar is to the right of capture entity B's avatar. In another example, capture entity A's avatar is on a hill and capture entity B's avatar is at ground level.

In one embodiment, Operation 1 illustrates a capture entity 106 preparing to participate in a simulation. In one embodiment, to participate in such a simulation, a capture entity 106 such as a participant (e.g., living being) can don a wearable computing device 114. The peripherals of the wearable computing device 114 can include, but are not limited to the HMD 112, a microphone, a set of headphones and/or a computing device capable of transmitting, receiving and/or processing data. Further, the participant (e.g., living being) can be outfitted with a wearable gear (e.g., clothing, equipment, etc). In one embodiment, the wearable gear may be attached with retro reflective markers 110 and/or other items that support the motion capture simulation system 100 tracking the participant's movement. In one embodiment, if the capture entity 106 includes equipment associated with the participant and/or any other object, the markers 110 can be attached directly to the equipment and/or object.

In one embodiment, after suiting up, the participant can be registered as a capture entity 106 with the simulator engine. In another embodiment, the equipment associated with the participant can be registered as a capture entity 102. In one embodiment, any object in the capture volume can be registered as a capture entity 106. The operation of registering as a capture entity 106 can include creating an avatar of the capture entity 106 in the simulated virtual environment 118. Further registering as a capture entity 106 can include establishing an association between the capture entity's wearable computing device 114 and the capture entity's avatar 116.

After being registered, the capture entity 106 is now free to join other capture entities in the simulated scenario. While in the capture volume, the motion capture simulation system 100 can determine the position and actions (e.g., motion data) of the capture entities. Using the motion data, the simulator engine 402 can integrate the capture entity 106 into the simulated virtual environment 118 by driving the behavior of the capture entity's avatar in the simulated virtual environment 118 using the captured behavior (e.g., motion data) of the capture entity 106. Further, the capture entity avatar's view of the simulated virtual environment can be nearly simultaneously displayed in the capture entity's head-mounted display. The capture entity 106 can explore the simulated virtual environment and/or participate in the simulated events in the simulation scenario. In one embodiment, upon completion of the simulation scenario, the simulation can be optionally replayed for training or other purposes, as illustrated by operation 4 of FIG. 1. The sensory immersive motion capture simulation system is described in greater detail below, in association with FIG. 2.

Figure 2:
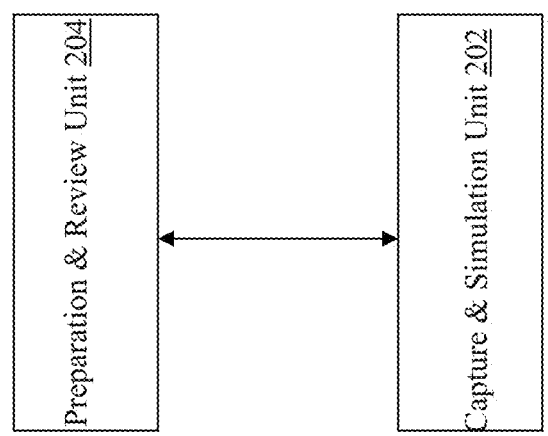
FIG. 2 illustrates a block diagram of the motion capture simulation system of FIG. 1, according to one or more exemplary embodiments.

Referring now to FIG. 1 and FIG. 2, FIG. 2 illustrates a block diagram of the motion capture simulation system of FIG. 1, according to one or more exemplary embodiments. In particular, FIG. 2 illustrates a preparation and review unit 204 and a capture and simulation unit 202.

In one embodiment, the capture and simulation unit 202 can be used to capture the movements and/or actions of the capture entity 106. In one embodiment, using the motion capture device 104 of the capture and simulation unit 202, the movements and actions of the capture entity 106 can be captured through taking images of the capture volume 102 that includes the capture entity. In another embodiment, the movement and actions of the capture entity 106 can be captured through continuously recording the capture volume 102 that includes the capture entity 106. Using the captured images/recording, the capture and simulation unit 202 can determine 3D motion data (e.g., position, orientation, velocity, etc.) of the capture entity 106 in the capture volume 102. The capture and simulation unit 202 can translate the 3D motion data of the capture entity 106 to a 3D motion data of the capture entity's avatar in the simulated virtual environment 118. In one embodiment, the capture and simulation unit 202 can drive the movements and actions of the capture entity's avatar 116 in the simulated virtual environment 118 based on the captured movements and actions of the capture entity 106 in the capture volume.

In one embodiment, the capture and simulation unit 202 can be used to generate a virtual character in the simulated virtual environment 118. Further, the capture and simulation unit 202 can be used to drive interactions between objects and avatars and/or avatars and virtual characters in the simulated virtual environment 118. In one embodiment, the capture and simulation unit 202 can drive the progression of events in the simulated virtual environment 118 based on the 3D motion data (e.g., position, orientation, velocity, etc.) of the capture entity 106. In one embodiment, the capture and simulation unit 202 can provide a visual, auditory, tactile, and/or olfactory feedback to the participant (e.g., capture entity 106) in near real time. The visual, auditory, tactile, and/or olfactory feedback can provide a sensory immersion experience to the participant (e.g., capture entity 106).

In one embodiment, the preparation and review unit 204 can be used to prepare a simulation environment. Preparing the simulation environment can include personalizing a capture entity 106. Personalizing a capture entity 106 can include matching the capture entity's avatar 116 with the physical attributes of the capture entity 106, such as matching the height of the avatar with that of the participant. Another example includes matching a shape of virtual representation of a weapon (e.g., avatar of weapon) with that of a weapon in the capture volume that is being motion captured. In addition, personalizing the capture entity 106 can include registering the capture entity 106 with the sensory immersion motion capture simulation system 100. Further, preparing the simulation environment can include loading a virtual environment (e.g., virtual world) based on the simulation. In one embodiment, a simulation scenario can be recorded live as the simulation is occurring using the preparation and review unit 204. In another embodiment, using the preparation and review unit 204, the simulation scenario can be stored once the simulation is over. For example, a simulation scenario could be a training scenario where the participants perform combat training in a simulated village environment. The simulation scenario can be stored after the participants finish the combat training or it can be stored as the combat training progresses. In one embodiment, the preparation and review unit 204 can facilitate a user replaying a stored (e.g., recorded) simulation scenario. In one embodiment, the stored simulation scenario may be replayed for training and/or other purposes.

In one embodiment, the capture and simulation unit 202 can be communicatively coupled to the preparation and review unit 204. In one embodiment, the capture and simulation unit 202 can communicate with the preparation and review unit 204 to load a virtual environment (e.g., virtual world such as jungle, urban city, etc.) that may be appropriate for a simulation. In another embodiment, the capture and simulation unit 202 can communicate with the preparation and review unit 204 to receive information including a list of the capture entities that have been registered with the motion capture simulation system 100. In a further embodiment, the capture and simulation unit 202 can communicate with the preparation and review unit 204 to store a simulation scenario for post simulation replay. In one embodiment, the capture and simulation unit 202 can transmit a 3D motion data (e.g., position, orientation, velocity, etc.) of the capture entity 106 to the preparation and review unit 204 for purposes of registration and/or personalization of the capture entity 106. The capture and simulation unit 202 and the preparation and review unit 204 are described in greater detail below, in association with FIG. 3 and FIG. 4.

Figure 3:
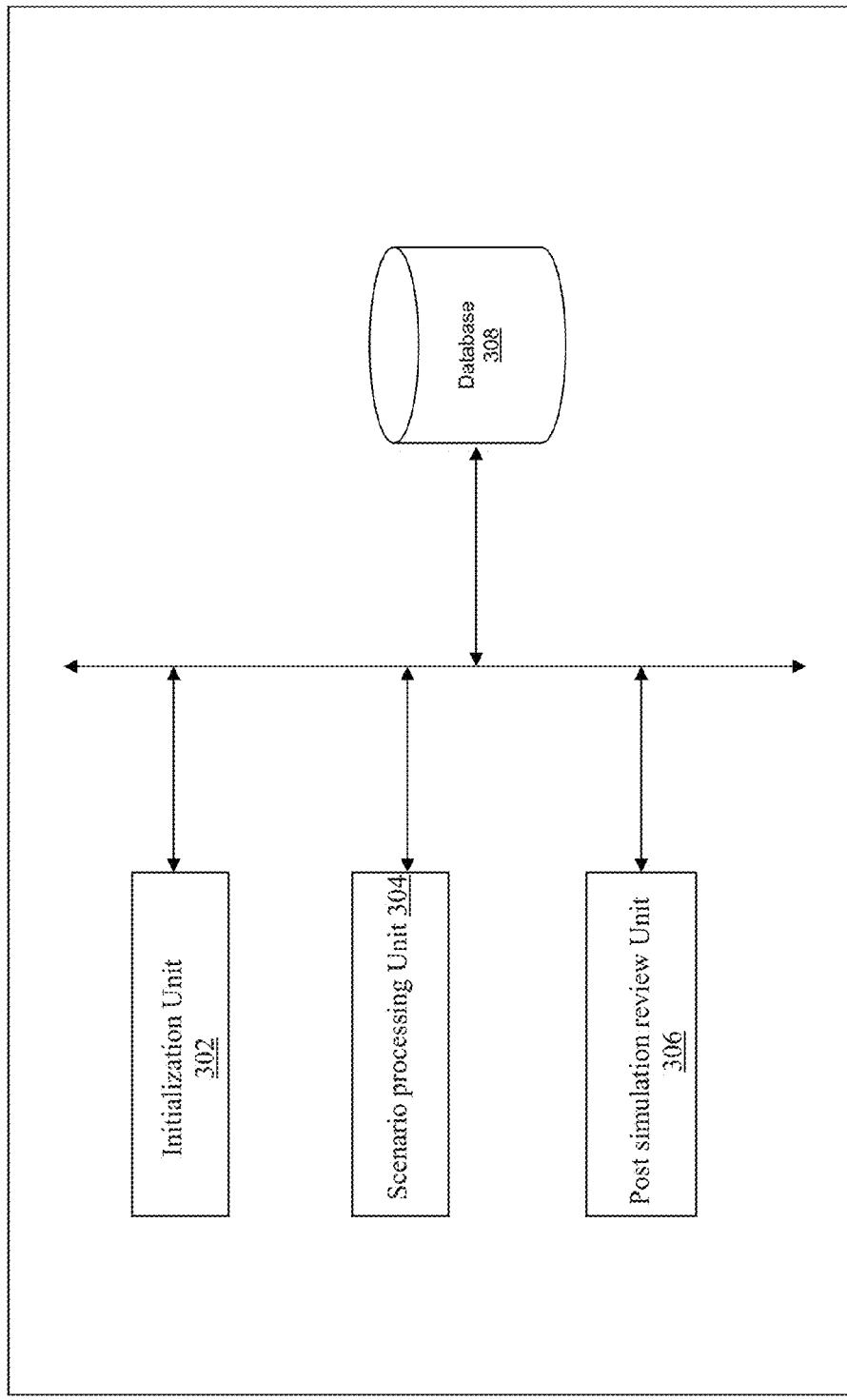
FIG. 3 illustrates a block diagram of the preparation and review unit of FIG. 2, according to one or more exemplary embodiments.

Now referring to FIG. 2 and FIG. 3, FIG. 3 illustrates a block diagram of the preparation and review unit of FIG. 2, according to one or more exemplary embodiments. In particular, FIG. 3 illustrates an initialization unit 302, a scenario processing unit 304, a post simulation review unit 306 and a database 308.

In one embodiment, the initialization unit 302 can include a data processing device such as a computer. In one embodiment, the data processing device can be a multi core processor device. In another embodiment, the data processing device can be combination of multiple single and/or multi-core processor devices communicatively connected via a network. Further, the initialization unit 302 can include an image capture device. In one embodiment, the initialization unit 302 can use the motion capture device 104 (shown in FIG. 4) of the capture and simulation unit 202 for purposes of capturing an image of the capture entity 106 (e.g., participant and/or an equipment associated with the participant). In one embodiment, the image of the capture entity 106 can be used for personalizing the capture entity 106. In one embodiment, personalizing the capture entity 106 can include matching a physical dimension of the capture entity 106 (e.g., participant) to the capture entity's avatar 116 in the simulated virtual environment 118. Further, personalizing a capture entity 106 (e.g., participant) can include associating a wearable computing device 114 to the capture entity 106.

In one embodiment, the initialization unit 302 can be at a remote location from the capture volume 102. For example, the operations of the initialization unit 302 are realized in a room that is separate from the capture volume 102. In another embodiment, the operations of the initialization unit 302 can be realized within the capture volume 102 such as when the initialization unit 302 uses the motion capture device 104 to capture an image of the capture entity 106.

In one embodiment, a participant (e.g., living being) dons a wearable gear and/or a wearable computing device 114. In one embodiment, the wearable computing device 114 can be a part of the wearable gear or vice versa. The wearable gear may include, inter alia a vest, an HMD, a microphone, and/or an earphone. In one embodiment, the wearable gear may be attached with retro reflective markers 110 to aid in tracking the capture entity 106. In the case of an equipment, the markers 110 can be attached directly to the equipment associated with the participant. In one embodiment, the markers on wearable gear can be used to track movement and action of any portion of the participant, such as head, body and/or legs. In one embodiment, the wearable gear may be a single wearable component that can be worn as one unit. In another embodiment, the wearable gear may be a combination of wearable components that can be worn separately.

In one embodiment, the initialization unit 302 can begin personalizing the participant (e.g., capture entity 106) by associating the participant (wearing the wearable gear and/or the wearable computing device 114) with an avatar having the physical dimensions of an average sized human being. The physical dimensions of the average size human being can be predefined. Once the participant (e.g., capture entity 106) is associated with the avatar, an image of the participant (e.g., capture entity 106) can be captured using an image capture device of the initialization unit 302. Using the data processing device, the initialization unit 302 can determine the marker positions of the wearable gear from the captured image of the participant (e.g., capture entity 106). The initialization unit 302 can process the marker positions using the data processing device to determine the actual physical dimensions of the participant (e.g., capture entity 106). In one embodiment, the initialization unit 302 can scale the dimensions of the avatar to match the actual physical dimensions of the participant (e.g., capture entity 106). Once the avatar is scaled, the initialization unit 302 can register the avatar as the participant's (e.g., capture entity 106) avatar 116. In one embodiment, the initialization unit 302 can register the participant (e.g., capture entity 106) as a capture entity 106, whereby when the participant (e.g., capture entity 106) enters the capture volume, the participant (e.g., capture entity 106) may be identified as the capture entity 106 by the motion capture simulation system 100. In one embodiment, the initialization unit 302 can associate the wearable computing device 114 of the participant to the participant (e.g., capture entity 106) and/or the participant's avatar. The initialization unit 302 can store the associations between the (e.g., capture entity 106) and the wearable computing device and/or the registration information in the database 308. In one embodiment, the initialization unit 302 can communicate the scaling information of the avatar and the registration of the participant (e.g., capture entity 106) and/or the participant's avatar 116 to the capture and simulation unit 202 for assisting with the operations of the capture and simulation unit 202.

In one embodiment, the scenario processing unit 304 can facilitate an operator (not shown in Figure) loading a virtual world based on a request from the capture and simulation unit 202. Further, the scenario processing unit 304 can be configured to import a virtual world (environment) from an online source. The scenario processing unit can include a data processing device capable of connecting to the Internet. The scenario processing unit 304 can store the imported scenarios in the database 308. In one embodiment, the capture and simulation unit 202 can access the virtual world directly from the database 308. In another embodiment, the scenario processing unit can retrieve the virtual world and communicate it to the capture and simulation unit 202. In one embodiment, the scenario processing unit 304 can support an operator editing appropriate features of the virtual world. The operator can add, remove or modify elements of the virtual world. In one embodiment, the scenario creation unit 304 can be configured to generate a number of virtual characters automatically. In another embodiment, using the scenario creation unit 304, an operator can create virtual characters. In one embodiment, an operator may create a virtual world using the scenario processing unit 304. The scenario processing unit 304 can include a user interface through which the operator can interact with the scenario processing unit 304.

In one embodiment, the post simulation review unit 306 can include a data processing device such as computer, a display device and/or and audio output device. In one embodiment, the capture and simulation unit 202 can store the recorded simulation scenario in the database 308. Using the post simulation review unit 306, a user can load a recorded simulation scenario from the database 308. The operator can further play the recorded simulation scenario for training and/or other purposes. The capture and simulation unit 202 is described in greater detail below, in association with FIG. 4.

Now referring to FIG. 2 and FIG. 4, FIG. 4 illustrates a block diagram of the capture and simulation unit of FIG. 2, according to one or more exemplary embodiments. In particular, FIG. 4 illustrates a tracking device 408, a simulator engine 402, a motion capture device 104, a wearable computing device 114 and/or a viewer device 410.

In one embodiment, the motion capture device 104 can be a high speed camera. The motion capture device 104 can include a processor to process an image captured using the motion capture device 104. In one embodiment, the motion capture simulation system 100 can use one or more motion capture devices to capture information about the locations of the markers (or the location of the subject in a markerless embodiment) as the capture entity moves. The motion capture device 104 can support high-speed image capture, as well as high-speed image processing. Each motion capture device 104 of the one or more motion capture devices may be connected to each other, as well as to a tracking device 408.

In an example embodiment, the one or more motion capture devices 104 are placed around the capture volume 102. The one or more motion capture devices 104 can be synchronized so that their shutters (which may be electronic rather than mechanical) open simultaneously. In one embodiment, the motion capture devices 104 can be synchronized by an external source. In another embodiment, the motion capture devices 104 can be synchronized based on an internal clock within each motion capture device 104. In an example embodiment, each motion capture device 104 may include a number of light emitters such as LEDs along the periphery of each of the motion capture device 104. During motion capture the LEDs may be turned on. The light from the LEDs may be reflected back from the retro reflective markers 110 attached to the wearable gear donned by the capture entity 106 and/or the retro reflective markers 110 attached to the equipment (e.g., weapon) associated with the capture entity 106. The captured image may include locations where the reflected LED light ray may have intersected the image sensor. The locations where the reflected LED light ray may have intersected the image sensor, as well as other characteristics are used to determine the locations of the markers.

Each motion capture device 106 determines coordinates for each marker that it sees. As the subject moves, the cameras capture the motion and provide marker data, which describes the location of the markers in the 3D space. In one embodiment, the motion capture device 104 may be configured to process the captured image. Processing the captured image can include subtracting a background image from the captured image. A background image may represent the capture volume 102 and is calculated for each motion capture device 104 of the plurality of motion capture devices. The background image can include items that will be present throughout the motion capture, such as the other motion capture devices and lights, and excludes the capture entity 106 and any other objects that will be the subject of the motion capture. Once the background image is determined, the background image can be used to determine a threshold image.

Further, processing the captured image can include comparing a captured image to the threshold image on a pixel-by-pixel basis to locate hot pixels. A hot pixel may be a pixel in the captured image that has intensity different (lower or higher) from that in the threshold image. Once the hot pixels are located, the pixels can be analyzed to locate connected hot pixels (segments) and connected segments (globs). If the characteristics of the globs satisfy the characteristics of the markers (or the subject in a markerless capture), then the globs are selected for further analysis to the tracking device 408. In one embodiment, the motion capture device 104 transmits the processed image to the tracking device 408.

In one embodiment, the tracking device 408 can receive the processed image including the segments and globs located by the motion capture device 104. The tracking device can determine the 3D motion data (e.g., position, orientation, velocity, etc.) for the candidate points corresponding to the selected globs. The tracking device 408 can use the 3D motion data (e.g., position, orientation, velocity, etc.) of the candidate points to track the positions of the candidate points between frames. The attributes for the candidate points can be compared to the expected attributes of the capture entity's motion. If there is a correlation, then the candidate points are used to determine the capture entity's motion. In one embodiment, the expected attributes of the capture entity 106 can be recorded and stored during the initialization process described in association with FIG. 3.

In one embodiment, the tracking device 408 can send the 3D motion data (e.g., position, orientation, velocity, etc.) of the capture entity 106 to the simulator engine 402. In another embodiment, the tracking device 408 can send the 3D motion data (e.g., position, orientation, velocity, etc.) of the capture entity 106 to the wearable computing device 114 of the capture entity 106. If there are a number of capture entities, then the tracking device 408 can select which capture entity's 3D motion data (e.g., position, orientation, velocity, etc.) is to be sent to the wearable computing device 114. For example, if a capture volume 102 includes capture entity A and capture entity B, then the tracking device 408 can choose to send the 3D motion data (e.g., position, orientation, velocity, etc.) of both capture entities A and B to the simulator engine 402. The 3D motion data (e.g., position, orientation, velocity, etc.) of capture entity A can be sent to the wearable computing device 114 of capture entity A. The 3D motion data (e.g., position, orientation, velocity, etc.) of capture entity B can be sent to the wearable computing device 114 of capture entity B. In one embodiment, the operations of the tracking device 408 can be performed by the motion capture device 104. In one embodiment, the 3D motion data may be determined by the motion capture device 104 and the motion capture device 104 may transmit the 3D motion data directly to the simulator engine 402. In another embodiment, the 3D motion data can be directly transmitted to the wearable computing device 114 from the motion capture device 104 and/or the tracking device 408.

In one embodiment, the simulator engine 402 can include a multi-core processor. In another embodiment, the simulator engine 402 can include a combination of multiple single and/or multi-core processors. In one embodiment, the simulator engine 402 can include a memory coupled to the processor. The memory may be non transitory storage medium, in one embodiment. The memory may include instructions. The processor may execute the instructions to perform operations that characterize the movements and actions of the capture entity 106 with high fidelity and nearly immediately and accurately translate the movements and actions of the capture entity 106 into corresponding movements and actions of the capture entity's avatar 116. In one embodiment, the simulator engine 402 can include one or more data processing devices such as computers mounted on a rack. The simulator engine 402 can include a user interface. An operator may access the simulator engine 402 through the user interface.

In one embodiment, the simulator engine 402 can receive the 3D motion data of the capture entity 106 from the tracking device 408. In another embodiment, the simulator engine 402 can receive the 3D motion data of the capture entity 106 from the motion capture device 104. In one embodiment, the simulator engine 402 can receive the 2D motion data of the capture entity 106 from the motion capture device 104. The simulator engine 402 can transform the 2D motion data from the motion capture device 104 to a 3D motion data of the capture entity 106. In one embodiment, the simulator engine 402 can receive a physiological data associated with the capture entity 106 from the wearable computing device 114 of the capture entity 106. The physiological data may be an audio data, a tactile data, and/or olfactory data (e.g., heart rate, EKG, ECG, etc.)

Using the processor, the simulator engine can also process the audio data, tactile data, and/or olfactory data associated with the capture entity 106 (e.g., participant) to generate a feedback data for the capture entity 106 (e.g., participant). Further, using the processor, the simulator engine 402 can process the 3D motion data of the capture entity 106 to drive the capture entity's avatar 116 in the simulated virtual environment 118. In addition, the simulator engine 402 can drive the interaction of the capture entity's avatar 116 with the virtual characters in the simulated virtual environment 118. The simulator engine 402 can also drive the interaction of the capture entity's avatar 116 with the objects in the simulated virtual environment 118. The simulator engine 402 can control the interaction and/or behavior of the virtual character based on an artificial intelligence logic algorithm.

In one embodiment, the interactions of the virtual character, the capture entity's avatar 116 and/or the objects in the simulated virtual environment 118 can create sensory effects such as an audio effect (e.g., sound of an character walking in the simulated environment, sound of a shooting a gun in the simulated environment, the sound of a capture entity's avatar talking in the simulated environment, sound of a virtual character hitting against a prop in the simulated environment, sound generated by a vehicle in the simulated environment, speech of a virtual character, etc.), a visual effect (e.g., shadows of characters changing as they walk based on the position of the character in the simulated environment, bleeding responsive to getting shot at, etc.) and/or a physiological effect (e.g., vibrations, electrical stimulation, etc.) The simulator engine 402 can transmit the various sensory effects, as auditory data, visual data, tactile data and/or olfactory data, to the wearable computing device 114 of the capture entity 106.

In one embodiment, the simulator engine 402 can periodically update the 3D motion data (e.g., position, orientation, velocity, etc.) of the capture entity's avatar 116, the 3D motion data (e.g., position, orientation, velocity, etc.) of the virtual character and/or the objects in the simulated virtual environment. In an example embodiment, the simulated virtual environment 118 is updated based on a frame rate at which the simulation is played, such as 60 frames per second. The frame rate can be variable. In one embodiment, the simulator engine 402 can transmit the updated 3D motion data (e.g., position, orientation, velocity, etc.) of the capture entity's avatar 116, the 3D motion data (e.g., position, orientation, velocity, etc.) the virtual character and the objects in the simulated virtual environment 118 to the wearable computing device 114 of the capture entity 106. In one embodiment, the simulator engine 402 can transmit the updated data through individually sending the updated data to a specific wearable computing device 114 of the capture entity. In another embodiment, if there are one or more capture entities, the simulator engine 402 can transmit the updated data by broadcasting the updated data. The updated data can include the 3D motion data (e.g., position, orientation, velocity, etc.) of the capture entity's avatar 116, the 3D motion data (e.g., position, orientation, velocity, etc.) the virtual character, the 3D motion data (e.g., position, orientation, velocity, etc.) of objects in the simulated virtual environment 118 and/or a simulation scenario data to the wearable computing device 114. Further the simulator engine 402 can transmit an audio data, a visual data, a tactile data and/or an olfactory data to the wearable computing device 114 of the capture entity 106. The simulator engine 402 can be communicatively coupled to the wearable computing device 114.

In one embodiment, the wearable computing device 114 can receive the updated data from the simulator engine 402. Further, the wearable computing device 114 of the capture entity 106 (e.g., participant) can receive the audio data, the visual data, the tactile data and/or the olfactory data from the simulator engine 402. The wearable computing device can customize the data to the perspective of the capture entity 106 (e.g., participant) associated with the wearable computing device 114.

In one embodiment, the visual data can be provided to an HMD 112 worn by the capture entity 106. The visual data can drive a 1st person stereoscopic POV display provided for the capture entity 106 via an HMD 112. The audio data can be managed by providing a surround-sound effect through individual headphones and/or a general multi-speaker sound system. Tactile and olfactory data can be provided through a respective devices associated with the capture entity 106. The wearable computing device 114 of the capture entity 106 (e.g., participant) can use the audio data, the visual data, the tactile data and/or the olfactory data to provide an immediate and tactile experience drawing the capture entity 106 into a belief that the experience is real (e.g., sensory immersive experience).

In one embodiment, the wearable computing device can include a microphone. The wearable computing device 114 can capture a sound (or speech) of capture entity 106 (e.g., participant) through a microphone coupled to the capture entity 106. Further, the wearable computing device 114 can sample the sound. In one embodiment, the wearable computing device 114 can transmit the sampled sound to the simulator engine 402. In some embodiments, the wearable computing device 114 can process the captured sound to recognize a speech. In one embodiment, the wearable computing device 114 can transmit the processed sound and/or the recognized speech to the simulator engine 402.

In one embodiment, the simulator engine can transmit a simulation scenario to a display device 410. The simulation scenario can include the simulated virtual environment 118, the updated 3D motion data of all the objects, the virtual character, the capture entity's avatar, the audio data, the visual data, the tactile data and/or the olfactory data. In one embodiment, the simulation scenario can be transmitted as a video data. The display device 410 can process the video data and/or the simulation scenario to display the simulation to an external user. The external user can view the simulation scenario as and when the simulation is in progress, such as when the capture entities are performing actions in the capture volume for the simulation. The display device 410 can include, inter alia a TV, a computer, a monitor, a LCD display, LED display and/or smart display. In one embodiment, the display device 410 can receive simulation scenario and/or the video data from the wearable computing device 114. In one embodiment, the display device 410 can display the simulation from different perspectives, such as from the perspective of a trainer and/or a participant. In one embodiment, the different perspectives may be displayed through a partitioned view over a single display interface such that an external user need not use multiple display devices to view the simulation from each perspective. In an alternate embodiment, the display device can include one or more display interfaces that are connected to each other.

Figure 5:
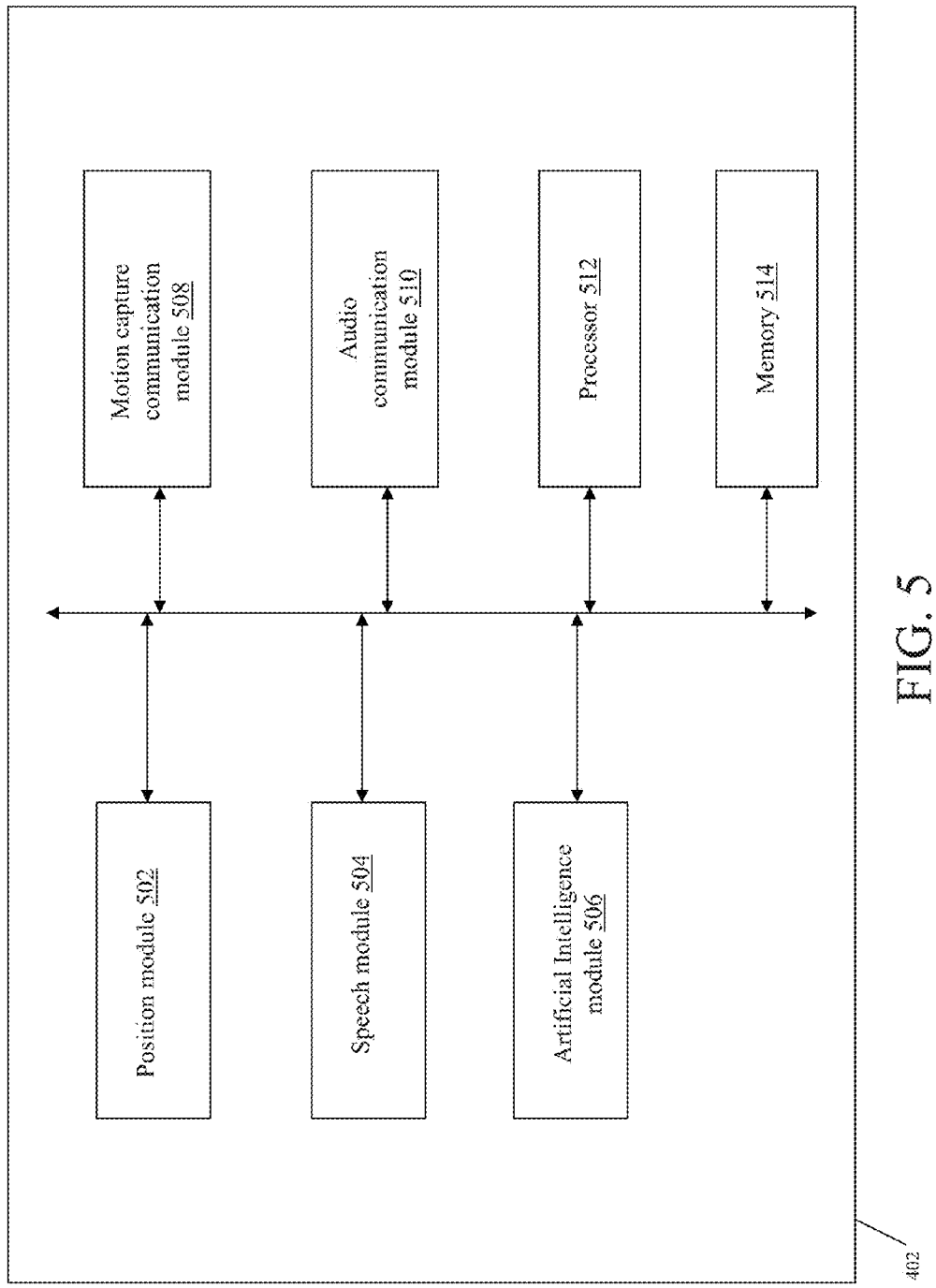
FIG. 5 illustrates a block diagram of the simulator engine of FIG. 4, according to one or more exemplary embodiments.

Now refer to FIG. 1, FIG. 4 and FIG. 5. FIG. 5 illustrates a block diagram of the simulator engine of FIG. 4, according to one or more exemplary embodiments. In particular, FIG. 4 illustrates a position module 502, a speech module 504, an artificial intelligence module 506, a motion capture communication module 508, an audio communication module 510, a processor 512 and/or a memory 514. A participant in the capture volume 102 can have a corresponding avatar in the simulated virtual environment 118. The participant in the capture volume 102 can interact with the simulated virtual environment using the participant's avatar. The participant in the capture volume 102 can be a capture entity 106. The participant can don a wearable gear attached with markers. The location of the markers can be used to match a dimension of the participant's avatar to the physical dimensions of the participant. In one embodiment, the wearable gear can include, inter alia a HMD 112, a headphone and/or a microphone. The HMD, headphone and/or the microphone may be coupled to a wearable computing device 114 donned by the participant. The HMD can be used to provide a visual feedback data to the participant. Using the visual feedback data, the HMD can provide a first person stereoscopic POV display of the simulated virtual environment 118 to the participant. The first person stereoscopic POV display of the simulated virtual environment 118 can be from the perspective of the participant's avatar. The first person stereoscopic POV display of the simulated virtual environment 118 from the perspective of the participant's avatar can cause a sensory immersion of the participant into the simulated virtual environment. The sensory immersion can cause the participant to interact with the simulated virtual environment 118 as if it were the real world.

In one embodiment, a movement and/or action of the participant in the capture volume 102 can be translated to a corresponding movement and/or action of the participant's avatar in the capture volume. The movement and/or action of the participant can be captured using a number of motion capture devices (e.g., motion capture device 104). The captured movement and/or actions of the participant can be used to determine a 3D motion data of the participant's avatar in the simulated virtual environment 118. The 3D motion data can include the position, the orientation and/or velocity of movement of the participant's head. In one embodiment, a speech of a participant in the capture volume 102 can be translated to a speech of the participant's avatar in the simulated virtual environment. The speech of the participant can be captured using an audio input device (e.g., microphone) associated with the participant.

In an example embodiment, if a participant wants to vocally communicate with a virtual character in the simulated virtual environment 118, the participant can speak through a microphone associated with the participant in the capture volume 102. The speech of the participant in the capture volume 102 is conveyed to the virtual character in the simulated virtual environment as a speech of the participant's avatar in the simulated virtual environment 118, thereby transporting a speech in the capture volume 102 into a simulated virtual environment 118. The speech of the participant's avatar can correspond to the speech of the participant in the capture volume 102.

In one embodiment, a participant can initiate an interaction with a virtual character in the simulated virtual environment 118 by speaking through a microphone. In an alternate embodiment, the participant can initiate the interaction with a virtual character using a motion cue. The motion cue can be interpreted by the virtual character as a specific instruction. For example, a participant raises a participant's hand and points one or more fingers to a certain direction to indicate that the virtual character must move to the direction in which the fingers are pointed, etc. In one embodiment, the participant can interact with a virtual character through a combination of speech and motion of the participant in the capture volume. For example, the participant can perform gestures (e.g., with the hand) while speaking. The hand gestures may correspond to the speech. The virtual character may respond based on both speech and motion of the participant.

Figure 8:
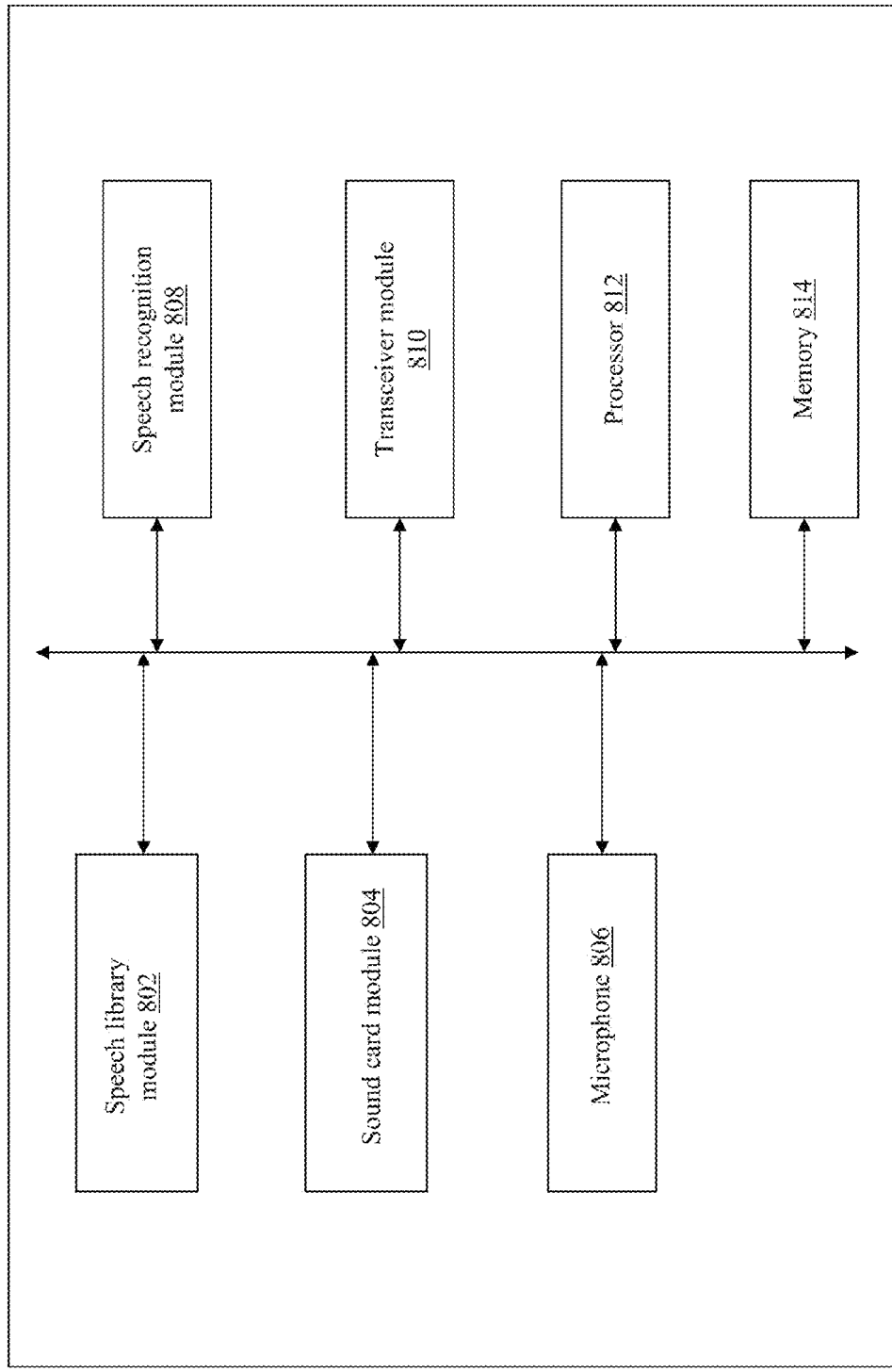
FIG. 8 illustrates a block diagram of the wearable computing device, according to one or more exemplary embodiments.

When a participant in a capture volume 102 speaks through a microphone, the microphone can capture the speech and feed it to the wearable computing device 114 of the participant. The wearable computing device can process the speech to generate an audio data. Generating the audio data can include additional operations that are described in greater detail below, in association with FIG. 8. The audio data may be associated with the participant in the capture volume 102. The audio data can be transmitted to the simulator engine 402. In an additional embodiment, the audio data can be broadcasted directly to wearable computing devices of other participants in the capture volume. In an alternate embodiment, the audio data can be transmitted to wearable computing devices of selected participants based on a 3D motion data (position and/or orientation) of the selected participants' avatars relative to the avatar of the participant associated with the audio data in the simulated virtual environment. In one embodiment, the participants are selected based on whether the audio data is relevant to the participant and/or the participant's avatar Now refer to FIGS. 1-4 and FIG. 8. FIG. 8 illustrates a block diagram of the wearable computing device, according to one or more exemplary embodiments. In particular, FIG. 8 illustrates a speech library module 802, a sound card module 804, a microphone 806, a speech recognition module 808, a transceiver module 810, a processor 812 and/or a memory 814. In one embodiment, the wearable computing device can include a surround sound library.

In one embodiment, the participant can speak through a microphone 806. In another embodiment, the participant can speak through any audio input device that is configured to capture any communicative sound generated by the participant. The microphone 806 can capture the sound and/or speech. In one embodiment, the microphone 806 can feed the captured sound and/or speech (hereinafter "microphone data") to the sound card module 804. Using the processor 812, the sound card module 804 can sample the microphone data at a predefined rate to generate an audio data.

In another embodiment, the microphone 806 can feed the microphone data to the speech recognition module 808. The speech recognition module 808 can speech process the microphone data to generate an audio data. Speech processing the microphone data can include comparing the microphone data with a speech recognition grammar stored in a speech library module 802 using the speech recognition module 808. The grammar can be pre-stored in the speech library module 802. In one embodiment, the grammar can be stored in a memory 814. The memory 814 can be volatile or non-volatile. Speech recognition grammar can tell a speech recognition module 808 what to expect a participant to say. In one embodiment, a speech recognition grammar can include a set of word patterns. A speech recognition grammar can include a set of utterances. An utterance can be a complete unit of speech, such as character strings of spoken phrases. The grammar can include various ways in which a participant may speak the phrases. In one embodiment, the speech recognition module 808 can analyze the microphone input to determine if the microphone data matches an utterance. In one embodiment, if the microphone data matches and utterance, then the speech recognition module can communicate the matched utterance as audio data that is speech processed. In one embodiment, the audio data can be sampled and/or speech processed. In one embodiment, the audio data can include the communicative sound generated by the participant in the capture volume 102 which is sampled. In another embodiment, the audio data can include the matched utterance along with the sound. In a further embodiment, the audio data can include the utterance.

In one embodiment, speech processing the microphone data can include semantically interpreting the microphone data (e.g., sound, speech) to extract a meaning conveyed by the microphone data. Using the meaning conveyed by the microphone data, the speech recognition module 808 can determine an intent of the participant's avatar in the simulated virtual environment 118. In one embodiment, the audio data can include the intent of the participant's avatar. Further, the speech recognition module 808 can determine a quality of the microphone data. The quality of the microphone data may refer to an audio quality of the sound associated with the participant. The audio data can further include the audio quality of the sound associated with the participant.

The audio data is communicated to the transceiver module 810. In one embodiment, the transceiver module 810 can transmit the audio data to the simulator engine 402 over a network. The wearable computing device 114 of the participant can be communicatively coupled to the simulator engine 402.

Now refer back to FIG. 5. In one embodiment, the audio communication module 510 of the simulator engine 402 can receive the audio data of the participant in the capture volume 102. Further, the motion capture communication module 508 of the simulator engine 402 can be used to receive the 3D motion data of the participant in the capture volume 102. In one embodiment, the simulator engine 402 can receive the 3D motion data of the participant from the tracking device 408. In another embodiment, the simulator engine 402 can receive the 3D motion data of the participant from the motion capture device 104. Using the 3D motion data of the participant in the capture volume 102, the position module 602 of the simulator engine 402 can determine the 3D motion data of the participant's avatar in the simulated virtual environment 118. Further, using the 3D motion data of the participant's avatar, the position module 602 of the simulator engine 402 can calculate the distance between the participant's avatar and the virtual character in the simulated virtual environment 118, the orientation of the participant's avatar respective to the virtual character and/or the number of obstructions between the participant's avatar and the virtual character in the simulated virtual environment 118. The position module 502 is explained in greater detail below, in association with FIG. 6.

Figure 6:
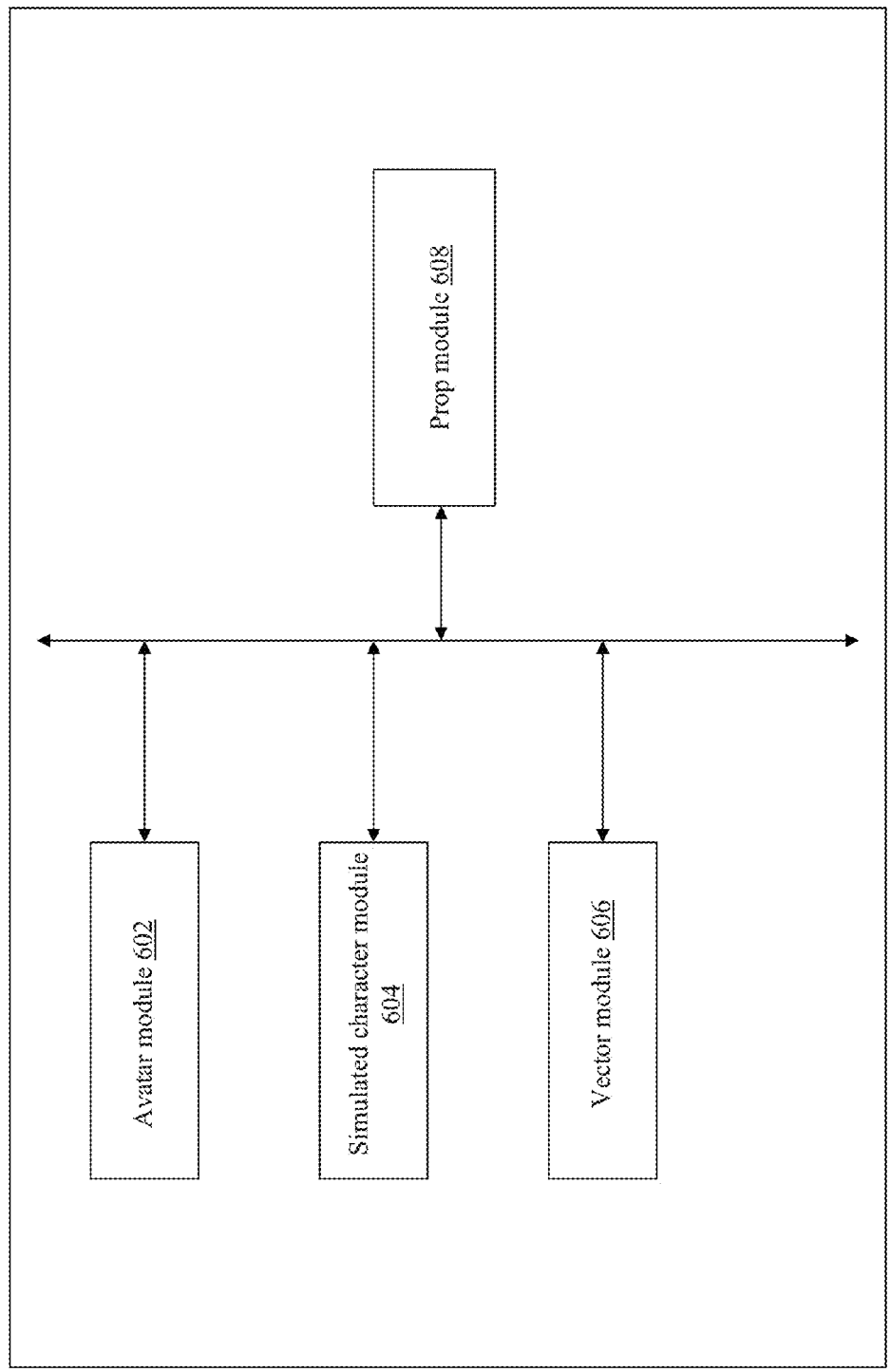
FIG. 6 illustrates a block diagram of the position module, according to one or more exemplary embodiments.

Now refer to FIGS. 1-5 and FIG. 6. FIG. 6 illustrates a block diagram of the position module, according to one or more exemplary embodiments. In particular, FIG. 6 illustrates an avatar module 602, a simulated character module 604, a vector module 606 and/or a prop module 608.

In one embodiment, the avatar module 602 of the position module 502 can be used to determine the 3D motion data of the participant's avatar in the simulated virtual environment 118. The 3D motion data of the participant's avatar can be determined using the 3D motion data of the participant in the capture volume 102. The 3D motion data of the participant in the capture volume 102 can include the position, orientation and/or velocity of motion of the participant's head. The simulated character module 604 of the position module 502 can be used to determine the 3D motion data of the virtual character in the simulated virtual environment 118. The 3D motion data of the virtual character can include a position, orientation and/or velocity of motion of the virtual character's head. The vector module 606 of the position module 502 can be used to calculate a vector between the coordinates representing the 3D motion data of the participant's avatar and the coordinates representing the 3D motion data of the virtual character in the simulated virtual environment 118. The vector can be generated between the heads of the virtual character and the participant's avatar in the simulated virtual environment 118. The length of the vector can represents the distance between the participant's avatar and the virtual character in the simulated virtual environment 118. The direction of the vector can represent a direction from where the sound originates (e.g., the participant's avatar) in the simulated virtual environment 118. In one embodiment, using a prop module 608, the position module 502 can determine a number of obstructions between the participant's avatar and the virtual character in the simulated virtual environment 118. The obstruction can be any object between the heads of the participant's avatar and the virtual character in the simulated virtual environment 118. For Some examples of obstructions are buildings, other avatars, other virtual characters, trees, vehicles, etc. The prop module 608 can be configured to check the vector against objects in the scene to determine the number of obstructions between the heads of the participant's avatar and the virtual character in the simulated virtual environment 118.

In one embodiment, if the distance between the heads of the participant's avatar and the virtual character is greater than a predefined value, then the virtual character may not react to the audio data generated by the participant's avatar in the simulated virtual environment 118. However, the audio data may be played in the simulated virtual environment 118 as if it originated from the participant's avatar in the simulated virtual environment 118.

The position module 502 can input the distance between the participant's avatar and the virtual character in the simulated virtual environment 118, the orientation of the participant's avatar respective to the virtual character and/or the number of obstructions between the participant's avatar and the virtual character in the simulated virtual environment 118 to the speech module 504.

Now refer back to FIG. 5. The speech module 504 can receive the distance between the participant's avatar and the virtual character in the simulated virtual environment 118, the orientation of the participant's avatar respective to the virtual character and/or the number of obstructions between the participant's avatar and the virtual character in the simulated virtual environment 118. Using the distance between the participant's avatar and the virtual character in the simulated virtual environment 118, the orientation of the participant's avatar respective to the virtual character and/or the number of obstructions between the participant's avatar and the virtual character in the simulated virtual environment 118, the speech module 504 can determine a set of factors that can affect an audio data. The audio data can be received from the audio communication module 510. Using the processor 512, the speech module 504 of the simulator engine 402 can process the audio data to determine an attribute of the audio data at a location of a virtual character in the simulated virtual environment 118 based on a set of attenuation factors. The attenuation factors can include inter alia the distance between the participant's avatar and the virtual character in the simulated virtual environment 118 and/or the number of obstructions between the participant's avatar and the virtual character in the simulated virtual environment 118. The speech module 504 is described in greater detail below, in association with FIG. 7.

Figure 7:
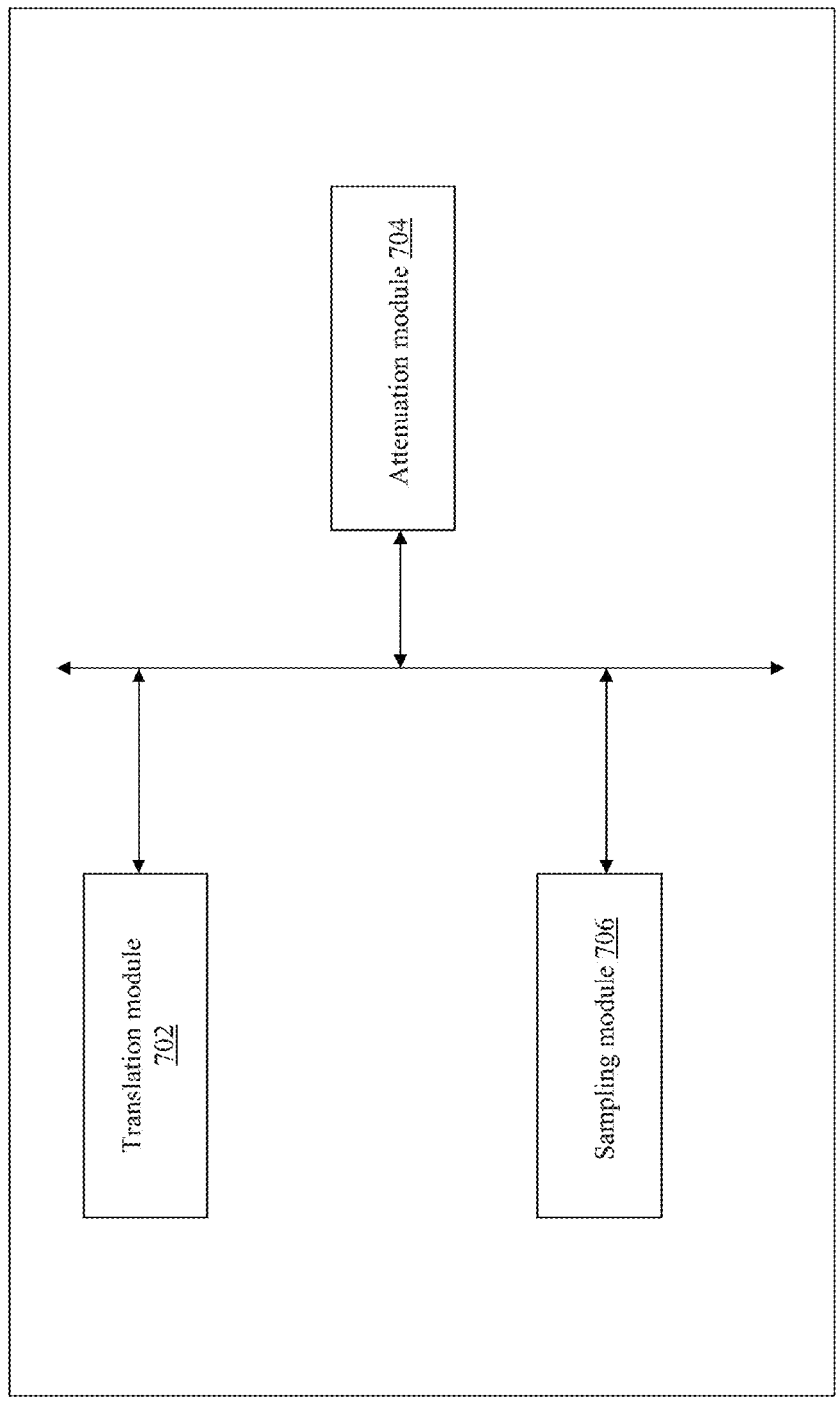
FIG. 7 illustrates a block diagram of the speech module, according to one or more exemplary embodiments.

Now refer to FIGS. 1-5 and FIG. 7. FIG. 7 illustrates a block diagram of the speech module, according to one or more exemplary embodiments. In particular, FIG. 7 illustrates a translation module 702, an attenuation module 704 and/or a sampling module 706.

In one embodiment, the translation module 702 is configured to associate the audio data generated by the participant in the capture volume to the participant's avatar in the simulated virtual environment 118. Further, a peak amplitude value of the audio data can be determined using the sampling module 706. The maximum absolute value of the amplitudes in the audio data can give the peak amplitude value. The audio data can include a communicative sound generated by the participant. The sound can be captured using a microphone associated with the participant. In another embodiment, the audio data can include an utterance as described in FIG. 8. The utterance can be combined with an attribute of the sound. The utterance can be associated with the sound. The sound can be analyzed to determine if the sound matches any stored sentences. If the match is found the utterance is transmitted as audio data. In one embodiment, along with the utterance, the wearable computing device 114 of the participant can add the attributes of the sound, such as amplitude (without having the send the sound, only the attributes of the sound are transmitted).

Further, the attenuation module 704 is configured to calculate an amplitude value of the sound at the location of the virtual character based on the set of attenuation factors. In one embodiment, if obstructions are found to exist, sound attenuation properties assigned to each of the obstructing objects can be used to further reduce the amplitude of the sound at the location of the virtual character. In an alternate embodiment, the obstruction objects may restrict sound in a Boolean fashion, such that some objects allow sound to pass while other objects block sound.

Now refer back to FIG. 5. After being attenuated based on distance and obstructions, the attribute of the sound (e.g., amplitude) generated by the participant's avatar in the simulated virtual environment 118 is compared to a preset condition associated with the virtual character. In one embodiment, when the attribute of the audio data at the location of the virtual character matches a preset condition, the artificial intelligence module 506 of the simulator engine 402 can drive an action of the virtual character in the simulated virtual environment. In one embodiment, the attribute of the audio data can include amplitude of the audio data at the location of the virtual character. In one embodiment, the preset condition can include a condition where a value of the amplitude of the audio data at the location of the virtual character in the simulated virtual environment 118 is greater than a threshold amplitude value. In another embodiment, preset condition can include a condition where the value of the amplitude of the audio data is less than, greater than or equal to, or less than or equal to the threshold amplitude value.

In one embodiment, the artificial intelligence module 506 is configured to determine if the participant's avatar is outside a field of vision of the virtual character in the simulated virtual environment 118. For example, the participant's avatar is behind the virtual character, there is a wall between the participant's avatar and the virtual character. When the participant's avatar is outside the field of vision of the virtual character, the audio data of the participant's avatar can notify (e.g., alert) the virtual character of the presence of the participant's avatar. The virtual character can be alerted when the attribute of the audio data (e.g., amplitude of audio data of the participant's avatar) at the location of the virtual character matches the preset condition. When the attribute of the audio data at the location of the virtual character matches the preset condition, the artificial intelligence module 506 is configured to trigger a change in orientation of the virtual character such that the virtual character faces the participant's avatar that generated the audio data in the simulated virtual environment. Further, the artificial intelligence module 506 can cause the virtual character to get into a defensive mode. For example, the virtual character can hear the participant's avatar and turn around and point a gun at the participant's avatar.

In one embodiment, the artificial intelligence module 506 is configured to determine an emotion attribute of the participant's avatar using the attribute of the audio data (e.g., amplitude of audio data of the participant's avatar) at the location of the virtual character. For example, if the amplitude of the sound from the participant's avatar is greater than a threshold value then the artificial intelligence module 506 determines that the participant's avatar is shouting. The artificial intelligence module 506 is configured to determine if the participant's avatar is communicating with the virtual character. In one embodiment, if the participant's avatar is in the field of vision of a virtual character and/or the participant's avatar is facing the virtual character, then the artificial intelligence module 506 can determine that the participant's avatar is communicating with the virtual character. In one embodiment, when there are a number of virtual characters next to the participant's character and/or the participant's character is in the field of vision of a number of virtual characters, the artificial intelligence module 506 is configured to determine which virtual character of the number of virtual characters the participant's avatar is communicating with. Once it is determined which virtual character is being communicated with, the artificial intelligence module 506 can trigger the respective virtual character to react to the audio data associated with the participant's avatar.

Figure 9:
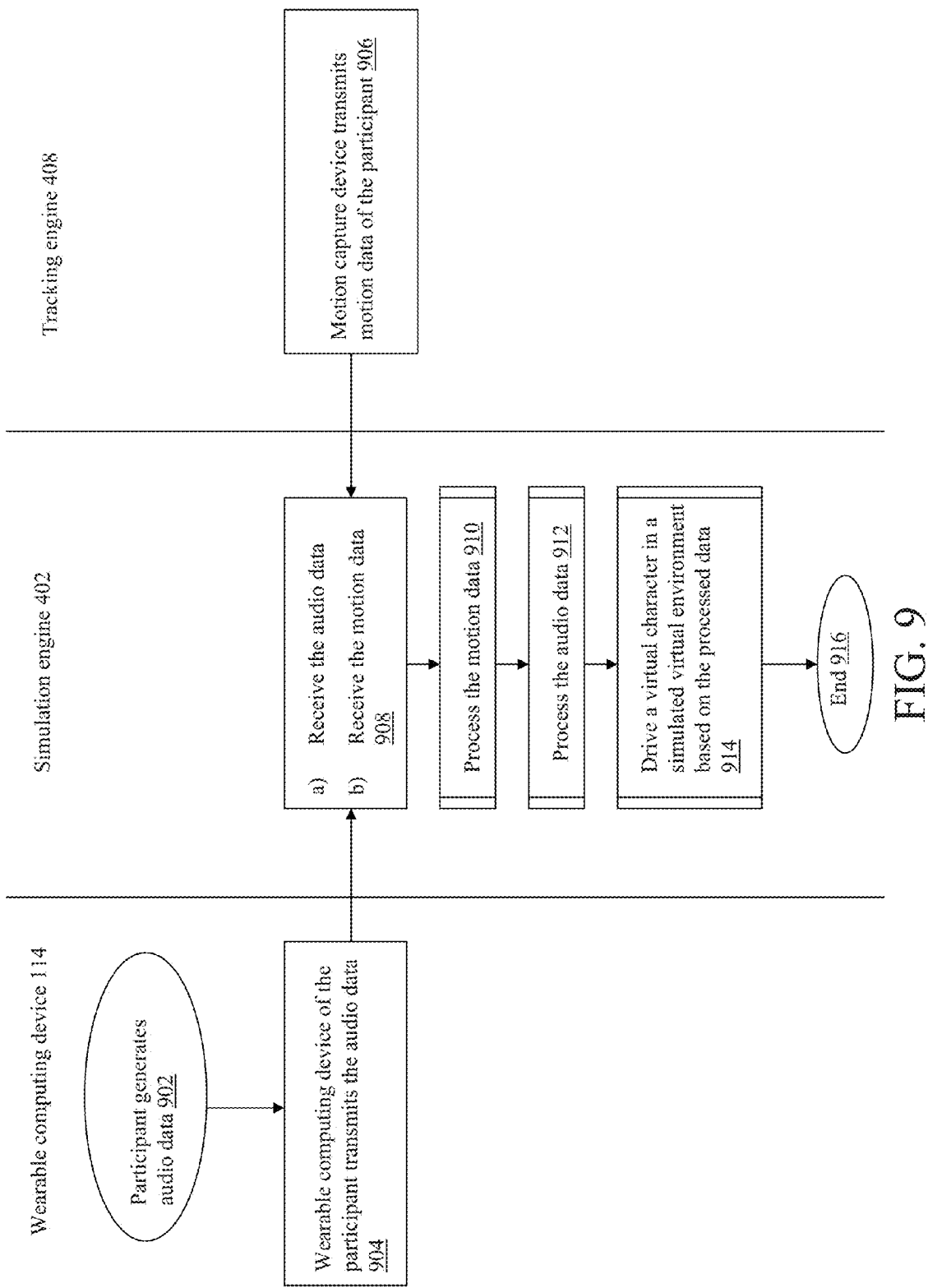
FIG. 9 illustrates a flow chart that depicts a method for communication in a sensory immersive motion capture simulation system, according to one or more exemplary embodiments.

Now refer to FIGS. 1-8 and FIG. 9. FIG. 9 illustrates a flow chart that depicts a method for communication in a sensory immersive motion capture simulation system, according to one or more exemplary embodiments. In operation 902, the participant generates a sound and/or speech in a capture volume 102. The sound and/or speech from the participant in the capture volume can be captured using a microphone 806 associated with the participant. The microphone 806 can be communicatively coupled to the wearable computing device 114 of the participant. The sound card module 804 of the wearable computing device 114 can sample the sound and/or speech to form an audio data. In one embodiment, the sound and/or speech can be analyzed by the speech recognition module 808 to determine is the sound and/or speech matched with a grammar stored in the speech library module 802. If the sound and/or speech match an utterance in the grammar, the wearable computing device can retrieve the utterance that corresponds to the sound and/or speech to form the audio data.

In operation 904, the wearable computing device 114 of the participant transmits the audio data to the simulator engine 402. The wearable computing device can be communicatively coupled to the simulator engine 402. The wearable computing device 114 can transmit the audio data over a wired and/or wireless network. In one embodiment, if the sound and/or speech match an utterance in the grammar, the utterance may be transmitted as audio data. In one embodiment, the audio data can include an utterance and/or a sound. In another embodiment, the audio data can include attributes of the sound and the utterance that corresponds to the sound and/or speech. In one embodiment, the sound can be a sampled sound.

In operation 906, a tracking engine 408 transmits a 3D motion data (e.g., position, orientation and/or velocity of motion) of the participant in the capture volume 102 to the simulator engine 402. In one embodiment, the motion capture device 104 can transmit the 3D motion data (e.g., position, orientation and/or velocity of motion) of the participant in the capture volume 102 to the simulator engine 402.

In operation 908, the simulator engine 402 receives the audio data from the wearable computing device 114 of the participant. Further, in operation 908, the simulator engine 402 receives the 3D motion data of the participant from the tracking device 408 and/or the motion capture device 104. In operation 910, the simulator engine 402 processes the motion data to determine a distance between the participant's avatar and a virtual character in the simulated virtual environment 118. Further, the motion data can be processed to determine the number of obstructions between the participant's avatar and the virtual character in the simulated virtual environment 118. The simulator engine 402 can process the motion data using the position module 502. Operation 910 includes additional operations that are described in greater detail below, in association with FIG. 10.

Now refer to FIGS. 1-9 and FIG. 10. FIG. 10 illustrates a flow chart that depicts a method of the position module, according to one or more exemplary embodiments. In operation 1002, the avatar module 602 of the position module 502 determines the 3D motion data of the participant's avatar in the simulated virtual environment 118 from the 3D motion data of the participant in the capture volume 102. The 3D motion data of the participant can include a position, orientation and/or the velocity of motion of the participant's head in the capture volume 102. The 3D motion data of the participant's avatar can include a position, orientation and/or the velocity of motion of the head of the participant's avatar in the simulated virtual environment 118. In operation 1004, the simulated character module 604 determines a 3D motion data of a virtual character in the simulated virtual environment. In one embodiment, the simulated character module 604 can determine the 3D motion data of all the virtual characters in the vicinity of the participant's avatar in the simulated virtual environment. In another embodiment, the simulated character module 604 can determine the 3D motion data of selected virtual characters in the simulated virtual environment 118.

In operation 1006, the vector module 606 of the position module 502 calculates a vector between the head of the participant's avatar and the virtual character in the simulated virtual environment 118. In one embodiment, the vector may start at the head of the participant's avatar and end at the head of the virtual character. In another embodiment, the vector may start at the head of the virtual character and end at the head of the participant's avatar. In one embodiment, the vector module 606 of the position module 502 can calculate a vector between the head of the participant's avatar and the heads of all the virtual characters in the vicinity of the participant's avatar. In another embodiment, the vector can be calculated between the coordinates representing the 3D motion data of the participant's avatar and the coordinates representing the 3D motion data of the virtual character. The velocity of motion can be represented by polar coordinate system. The position and/or orientation can be represented by Cartesian coordinates and/or geodetic coordinates system. The distance of the vector between the participant's avatar and the virtual character may represent a distance between the participant's avatar and the virtual character in the simulated virtual environment 118. The direction of the vector may represent the direction from which the audio data originates (e.g., participant's avatar). Further, in operation 1008, the prop module 608 of the position module 502 can determine a number of obstructions between the heads of the participant's avatar and the virtual character. The position module 502 can communicate the distance between the participant's avatar and the virtual character in the simulated virtual environment 118, the direction from which the audio data originates and/or the number of obstructions between the heads of the participant's avatar and the virtual character to the speech module 504 of the simulator engine 402.

Now refer back to FIG. 9. In operation 912, the speech module 504 of the simulator engine 402 processes the audio data to determine an attribute of the audio data at the location of the virtual character in the simulated virtual environment 118. Further, the speech module 504 can receive the information regarding the distance, direction and/or obstruction from the position module 502. Operation 912 includes additional operations that are described in greater detail below, in association with FIG. 11.

Figure 11A:
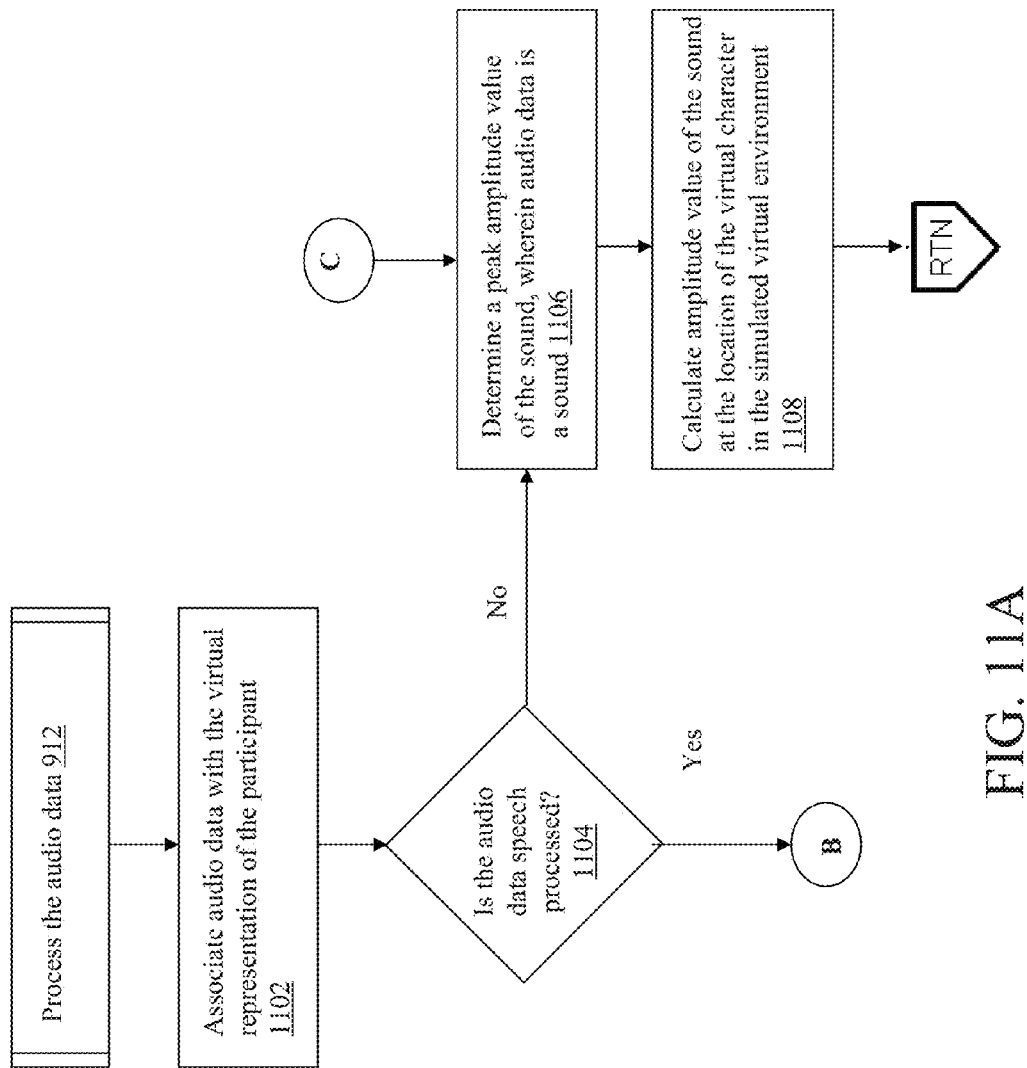
FIG. 11A illustrates a flow chart that depicts a method of the speech module, according to one or more exemplary embodiments.

Now refer to FIGS. 1-9 and FIG. 11A. FIG. 11A illustrates a flow chart that depicts a method of the speech module, according to one or more exemplary embodiments. In operation, 1102, the translation module 702 of the speech module 504 associates the audio data of the participant in the capture volume 102 to the participant's avatar in the simulated virtual environment 118. In operation 1104, the speech module 504 determines if the audio data is speech processed. The audio data may be speech processed in the wearable computing device 114 of the participant. Speech processing the audio data includes analyzing the sound and/or speech generated by the participant in the capture volume 102 to determine if the sound and/or speech match an utterance stored in the speech library module 802. If the sound and/or speech match an utterance stored in the speech library module 802, the audio data can include the utterance. In one embodiment, if the audio data includes an utterance, then the speech module 504 can determine the audio data is speech processed. If the audio data is speech processed, then the method of speech module proceeds to operation in operation 1110. If the audio data is not speech processed, then the method of speech module proceeds to operation in operation 1106.

Figure 11B:
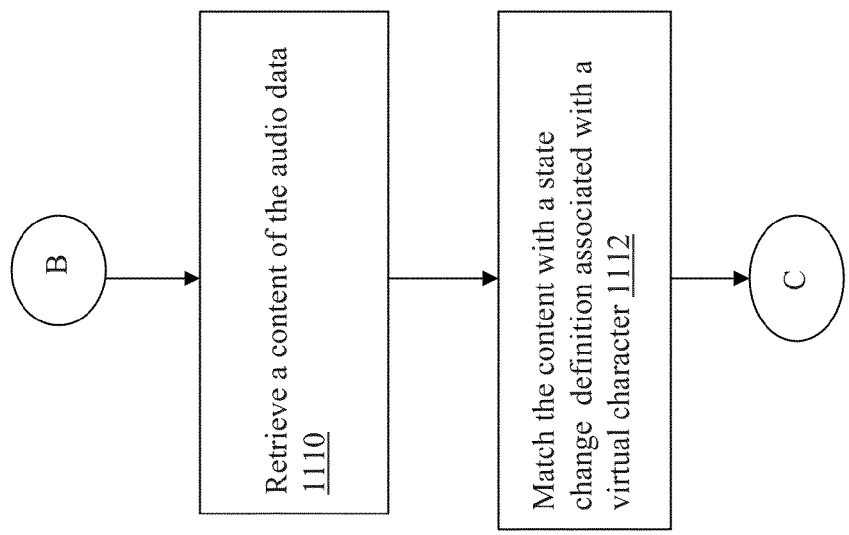
FIG. 11B illustrates a continuation of the flow chart shown in FIG. 11A, according to one or more exemplary embodiments.

Now refer to FIGS. 1-9, FIG. 11A and FIG. 11B. FIG. 11B illustrates a continuation of the flow chart shown in FIG. 11A, according to one or more exemplary embodiments. In operation 1110, the speech module 504 retrieves the content of the audio data (e.g., utterance). Example of an utterance is a phrase such as "Take three steps back". Further, in operation 1112, the speech module 504 matches (or associates) the content of the audio data (e.g., utterance) with a state change definition. The state change definition can be associated with the virtual character. For example, the speech module may associate the utterance "Take three steps back," with a state change definition that causes the virtual character to take three steps back in the simulated virtual environment. In one embodiment, the speech module may associate the utterance "Take three steps back," with a state change definition that causes the virtual character to take one of several possible actions. The virtual character may take three steps back, or they may stay in place and look confused if they did not understand the message, or they could turn around and run, or they could respond aggressively by charging at the participant's avatar or raising a weapon.

The state change definition may be set of instructions that related to the content of the audio data (e.g., utterance). The set of instructions may define an action of the virtual character specific to the content of the audio data. The action of the virtual character may be a response of the virtual character based on the content of the audio data (e.g., taking three steps back). Further, the sampling module 704 determines a peak amplitude value of the audio data, in operation 1106. The audio data may include attributes of the sound that correspond to the utterance. In one embodiment, the audio data can include the sound. The attribute of the sound may be amplitude of the sound. The maximum amplitude value of the samples of the sampled sound can provide the peak amplitude value of the audio data.

In operation 1108, the attenuation module 706 calculates the attribute of the audio data at the location of the virtual character in the simulated virtual environment 118. The attribute may include, but not limited to amplitude. The attribute of the audio data at the location of the virtual character can be calculated based on the distance between the participant's avatar and the virtual character in the simulated virtual environment 118, the direction from which the audio data originates and/or the number of obstructions between the heads of the participant's avatar and the virtual character to the speech module 504 of the simulator engine 402. If obstructions are found to exist, sound attenuation properties assigned to each of the obstructing objects are used to further reduce the amplitude of the sound at the virtual character's location. Alternatively, the objects may restrict sound in a Boolean fashion, such that some objects allow sound to pass while other objects block sound. The speech module 504 can communicate the attribute of the audio data at the location of the virtual character in the simulated virtual environment 118, to the artificial intelligence module 506 of the simulator engine 402.

Now refer back to FIG. 9. In operation 914, the artificial intelligence module 506 drives an action of the virtual character in the simulator virtual environment 118 based on the audio data, if the attribute of the audio data matches a preset condition. In one embodiment, the preset condition can include a condition where a value of the amplitude of the audio data at the location of the virtual character in the simulated virtual environment 118 is greater than a threshold amplitude value. In another embodiment, preset condition can include a condition where the value of the amplitude of the audio data is less than, greater than or equal to, or less than or equal to the threshold amplitude value. Operation 914 includes additional operations that are described in greater detail below, in association with FIG. 12 and FIG. 13.

Figure 12:
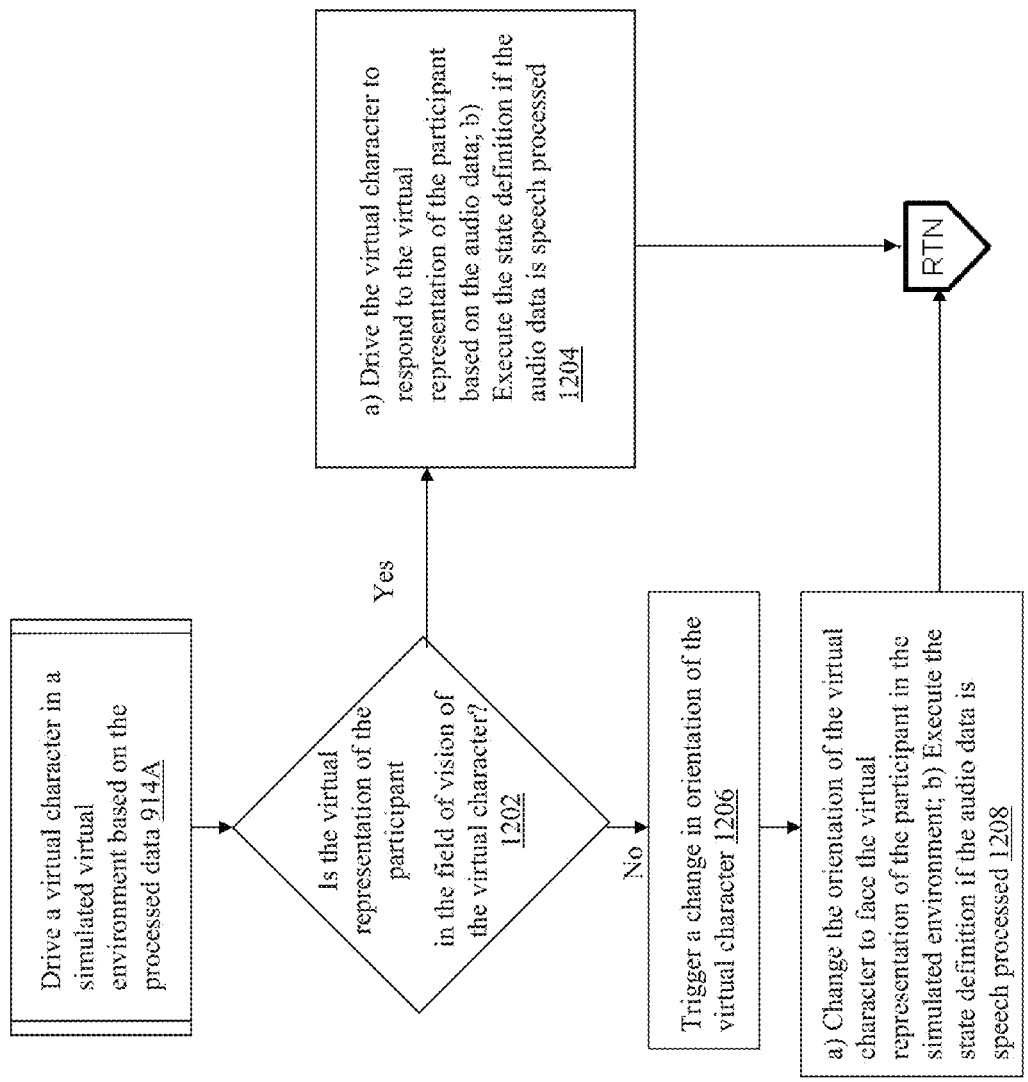
FIG. 12 illustrates a flow chart that depicts a method of the artificial intelligence module, according to one or more exemplary embodiments.

Now refer to FIGS. 1-9 and FIG. 12. FIG. 12 illustrates a flow chart that depicts a method of the artificial intelligence module, according to one or more exemplary embodiments. In one embodiment, the artificial intelligence module 506 determines if the participant's avatar is in a field of vision of the virtual character in the simulated virtual environment 118. For example, the participant's avatar is behind the virtual character, there is a wall between the participant's avatar and the virtual character. When the participant's avatar is outside the field of vision of the virtual character, the audio data of the participant's avatar can be used to notify (e.g., alert) the virtual character of the presence of the participant's avatar. The virtual character can be alerted when the attribute of the audio data (e.g., amplitude of audio data of the participant's avatar) at the location of the virtual character matches the preset condition. In operation 1206 and operation 1208, when the attribute of the audio data at the location of the virtual character matches the preset condition, the artificial intelligence module 506 triggers a change in orientation of the virtual character such that the virtual character faces the participant's avatar that generated the audio data in the simulated virtual environment. Further, the artificial intelligence module 506 can cause the virtual character to get into a defensive mode. For example, the virtual character can hear the participant's avatar and turn around and point a gun at the participant's avatar. In addition, if the audio data includes an utterance, the artificial intelligence 506 can execute the set of instructions (e.g., state change definition) that causes the virtual character to react to the utterance (e.g., content of the audio data). For example, the participant approaches a simulated character and says "Take three steps back!" (In the simulated virtual environment it appears as if the participant's avatar says "Take three steps back!" to the virtual character.) The microphone on the man-wearable device records this speech, and the recording is streamed into the speech recognition module. The speech recognition module compares the speech against the grammar, and returns the utterance (e.g., phrase) "TAKE THREE STEPS BACK". The 3D motion data is used to determine the orientation and position of the participant compared with that of the simulated character. After determining that the participant is speaking to the simulated character, the simulator engine maps the utterance to a change of state wherein the virtual character backs up three steps in the simulated virtual environment.

Figure 13:
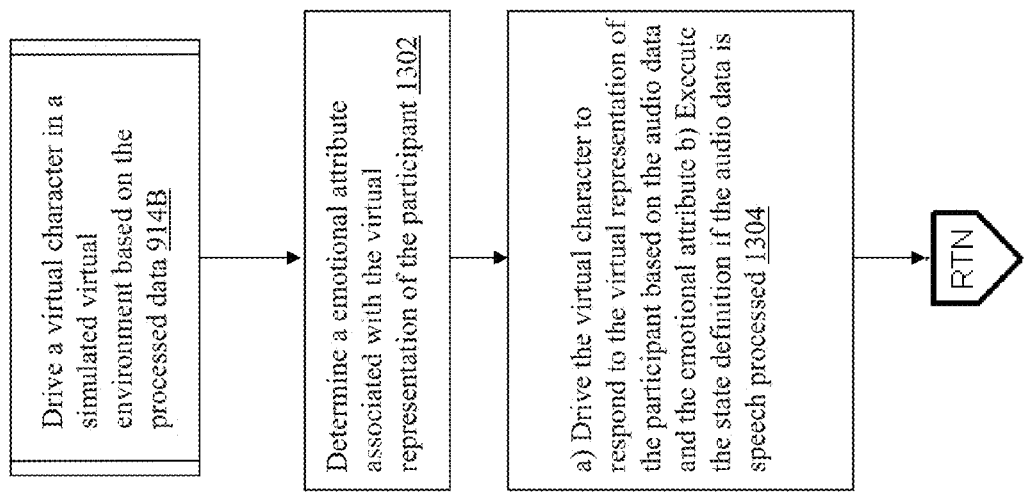
FIG. 13 illustrates a flow chart that depicts another method of the artificial intelligence module, according to one or more exemplary embodiments.

Now refer to FIG. 1-9 and FIG. 13. FIG. 13 illustrates a flow chart that depicts another method of the artificial intelligence module, according to one or more exemplary embodiments. In operation 1302, the artificial intelligence module 506 determines an emotion attribute of the participant's avatar using the attribute of the audio data (e.g., amplitude of audio data of the participant's avatar) at the location of the virtual character. For example, if the amplitude of the sound from the participant's avatar is greater than a threshold value then the artificial intelligence module 506 determines that the participant's avatar is shouting. The artificial intelligence module 506 is configured to determine if the participant's avatar is communicating with the virtual character. In one embodiment, if the participant's avatar is in the field of vision of a virtual character and/or the participant's avatar is facing the virtual character, then the artificial intelligence module 506 can determine that the participant's avatar is communicating with the virtual character. In one embodiment, when there are a number of virtual characters next to the participant's character and/or the participant's character is in the field of vision of a number of virtual characters, the artificial intelligence module 506 is configured to determine which virtual character of the number of virtual characters the participant's avatar is communicating with. In one embodiment, the amplitude of the audio data at the location of the virtual character along with other factors can be used to determine if the participant's avatar is communicating with the virtual environment. In operation 1304, once it is determined which virtual character is being communicated with, the artificial intelligence module 506 can trigger the respective virtual character to react to the audio data associated with the participant's avatar. The artificial intelligence module 506 can drive the virtual character to respond to the participant's avatar based on the audio data and/or the emotion attribute of the participant's avatar. For example, if the participant is speaking to the simulated character, amplitude greater than a threshold value might be used to infer that the participant is yelling at the simulated character, possibly even triggering the virtual character to an agitated state. In addition, if the audio data includes an utterance, the artificial intelligence 506 can execute the set of instructions (e.g., state change definition) that causes the virtual character to react to the utterance (e.g., content of the audio data).

Now refer back to FIG. 9. In operation 916, once the simulator engine 402 (the artificial intelligence module 506 of the simulator engine 402) drives the action of the virtual character the method of communication in a sensory immersive motion capture simulation system ends.

Referring now to FIG. 9 and FIG. 14, FIG. 14 illustrates a flow chart of a method of communication in a sensory immersion motion capture simulation environment, according to one or more exemplary embodiments.

Operations 902, 904 and 908 are described in FIG. 9. In operation 1402, the wearable computing device can process a sound associated with the participant to generate and audio data. The processing of the sound can include sampling the sound using the sound card module 804. Further, processing the sound can include semantically interpreting the sound using a sound recognition module 808, to determine intent of the participant's avatar in the simulated virtual environment.

Semantically interpreting the sound can include extracting a meaning conveyed by the sound, such as meaning of a speech associated with the participant. The meaning conveyed by the sound can be used to determine the intent of the participant's avatar. In addition, processing the sound can include determining an audio quality of the sound.

The audio data generated by the wearable computing device 114 of the participant can include the sampled sound, the intent of the participant's avatar and/or the audio quality of the sound. In one embodiment, the audio quality may include a meaning conveyed by the sound. Once the audio data is generated, the wearable computing device 114 of the participant may transmit the audio data to the simulator engine 402. In an additional embodiment, the wearable computing device 114 of the participant may broadcast the audio data to other participant's in the capture volume 102 over a wireless communication link. The other participants may receive the broadcasted audio data using their respective wearable computing devices. In an alternate embodiment, the wearable computing device 114 of the participant can transmit the audio data to selected participants in the capture volume 102. The recipients of the audio data from the wearable computing device 114 of the participant may be selected from one or more participants in the capture volume 102 based on a relevance of the audio data from the perspective of the one or more participants.

Operation 908 is described in greater detail in association with FIG. 9. In operation 1404, the simulator engine 402 processes the audio data based on the 3D motion capture data of the participant in the capture volume 102. The audio data can be processed to determine an attribute of the audio data. In one embodiment, the attribute of the audio data can include the intent of the participant's avatar, an audio characteristic of the sound, a source of the sound, and/or a recipient of the sound. In one embodiment, intent of the participant's avatar may be retrieved from the audio data. In another embodiment, when the audio data includes a meaning conveyed by the sound associated with the participant, then speech module 504 can determine the intent of the participant's avatar using the meaning conveyed by the sound. In one embodiment, the audio characteristic of the sound can include, but are not limited to amplitude of the sound, frequency of the sound and/or tone reflected by the sound.

In one embodiment, the audio attribute can be calculated at a location of the virtual character. In another embodiment, when the simulated virtual environment includes one or more virtual characters and other participant avatar, the audio attribute can be calculated at the location of each of the virtual characters and/or other participant avatars. The audio attribute can be calculated based on one or more attenuation factors. The attenuation factors can include, but is not limited to distance between the location of the participant's avatar and the location of the virtual character at which the audio attribute is determined and/or direction of the participant's avatar with respect to the said virtual character location. The distance and direction can be calculated in relation to other participants' avatars as well. The calculation of attenuation factors are described in greater detail in association with FIG. 9. Further FIG. 9 also describes in greater detail the process of determining attributes of the audio data based on the 3D motion data of the participant and/or the attenuation factors are described.

In operation 1406, the simulator engine 402 probabilistically drives a change of state of a virtual character in a simulated virtual environment based on the attribute of the audio data, a current state of the virtual character and a current state of the simulated virtual environment. Probabilistically driving a change of state of the virtual character can refer to changing from a current state of the virtual character to another state of the virtual character with a probability. The artificial intelligence module 506 of the simulator engine may have an option to change from a current state of the virtual character one or more other states associated with the virtual character. Each change may have a probability value assigned to it. For example, the current state may be changed to state A or state B. However, probability value assigned with changing to state A is 0.9 whereas the probability value assigned with changing to state B is 0.1. The change in state is added with a probability value that can be determined based on a probability model. The probability model may calculate the probability value to be assigned to the change in state of the virtual character. The input to the probability model can include, but not limited to the attribute of the audio data, a current state of the virtual character and a current state of the simulated virtual environment.

In one embodiment, the current state of a virtual character can include, but is not limited to an objective of the virtual character. For example, a virtual character may have an objective of guarding a tower or patrolling a region in the simulated virtual environment. The current state of the simulated virtual environment 118 can include a current state of any appropriate virtual character, other participants' avatars and/or position and orientation of inanimate objects in the simulated virtual environment. A change in state of the virtual character can include, but is not limited to a change in behavior of the virtual character, a change in level of trust, a response action of the virtual character, and/or change in awareness of the virtual character. In one embodiment a change in state of the virtual character can include a virtual character disobeying a command of a participant's avatar.

In one embodiment, the speech module 504 of the simulator engine 402 can determine if the audio data of the participant is speech processed. Further, responsive to determining that the audio data of the participant is speech processed, the speech module can determine the intent of the virtual representation of the participant based on the audio data. The speech module 504 can also determine the audio quality of the sound associated with the participant using the audio data. The audio quality and/or an attribute of the audio data can be used to determine whether the virtual character in simulated virtual environment can perceive the audio data of the participant. If the simulated virtual environment includes one or more virtual characters and/or other participants' avatars, the artificial intelligence module 506 can determine whether each of the virtual character and/or other participant's avatar can perceive the audio data of the participant.

In one embodiment, responsive to determining that the audio data is perceived by the virtual character, the artificial intelligence module 506 can map the intent of the participant's avatar with a state change definition of a plurality of state change definitions associated with the virtual character based on the current state of the virtual character, the current state of the simulated virtual environment, the attribute of the audio data and a probability value associated with the change of state of the virtual character. The state change definition associated with the virtual character can represent a set of instructions that defines a change in state of the virtual character. The artificial intelligence module may execute the set of instructions to drive the change of state of the virtual character. Once the simulator engine 402 (the artificial intelligence module 506 of the simulator engine 402) drives the change of state of the virtual character the method of communication in a sensory immersive motion capture simulation system ends in operation 1408.

In an example embodiment, John Doe and Jane Roe may be located in a capture volume 102. John Doe and Jane Roe may be motion captured using one or more motion capture devices 104. The motion capture data can be used to determine a 3D motion data of John Doe's avatar and Jane Roe's avatar in a simulated virtual environment. In the simulated virtual environment, John Doe's avatar may be in front of a building that is guarded by virtual character 1 and virtual character 2 that are in close proximity to John Doe's avatar. Further, in the simulated virtual environment Jane Roe's avatar may be 10 m behind John Doe's avatar.

Jane Doe may say "Let me go in," in the capture volume. John Doe's speech is capture by an audio input device associated with John Doe in the capture volume 102. The wearable computing device of John Doe processes the speech and interprets it semantically using a speech recognition module 808. The speech recognition module 808 determines that the speech is a request to let John Doe inside some place. The speech recognition module 808 can also determine the intent of John Doe is to get inside a location. Further, the speech recognition module 808 calculates an audio quality of the speech. The wearable computing device of John Doe can transmit the speech, the intent of John Doe and the audio quality as an audio data to the simulator engine. In one embodiment, the wearable computing device of John Doe can transmit the audio data to the wearable computing device of Jane Roe in the capture volume 102. In another embodiment, the audio data may be sent to Jane Roe's wearable computing device via the simulator engine 402. In one embodiment, if Jane Roe's avatar was miles away from the John Doe's avatar in the simulated virtual environment, the wearable computing device of John Doe may not transmit the audio data to Jane Roe in the capture volume. The simulator engine 402 receives the audio data and a corresponding motion data of John Doe and Jane Roe. The simulator engine calculates an attribute of the audio data at the location of the virtual character 1, virtual character 2 and Jane Roe's avatar to determine if any of the said characters or avatars could perceive the audio data in the simulated virtual environment. If it is determined that virtual character 1 and virtual character 2 can perceive the audio data, the artificial intelligence module drives a change in state of the virtual character 1 based on the attribute of the audio data, a current state of the virtual character 1 (e.g., guarding the entrance of the building that John Doe's avatar wants to enter) and a current state of virtual character 2 (current state of simulated virtual environment) and Jane Roe's avatar (current state of simulated virtual environment). Similar calculation may be performed for virtual character 2 as well.

The current state of virtual character 1 could change to one or more states such as not let John Doe's avatar inside, stay in place and look confused if they did not understand the message, or they could turn around and run, or they could respond aggressively by charging at the participant's avatar or raising a weapon, or ask to check papers to get inside the building, or let John Doe's avatar inside the building. Changing to each of the mentioned states can include a probability value. The probability value can be determined using a probability model that uses the attribute of the audio data, a current state of the virtual character and a current state of the simulated virtual environment as input. In the example embodiment, the artificial intelligence module 506 may let John Doe's avatar to get inside the building based on the attribute of the audio data, a current state of the virtual character and a current state of the simulated virtual environment. Further, the virtual character 1 and virtual character 2 may disagree with each other as well.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a machine readable medium). For example, the various electrical structure and methods may be embodied using transistors, logic gates, and electrical circuits (e.g., application specific integrated (ASIC) circuitry and/or in Digital Signal Processor (DSP) circuitry).

The terms "invention," "the invention," "this invention," and "the present invention," as used herein, intend to refer broadly to all disclosed subject matter and teaching, and recitations containing these terms should not be misconstrued as limiting the subject matter taught herein or to limit the meaning or scope of the claims. From the description of the exemplary embodiments, equivalents of the elements shown therein will suggest themselves to those skilled in the art, and ways of constructing other embodiments of the present invention will appear to practitioners of the art. Therefore, the scope of the present invention is to be limited only by the claims that follow.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method, comprising:

receiving, by a simulator engine, audio data of a participant in a capture volume, wherein, in a simulated virtual environment, the audio data of the participant is represented as audio data of a virtual representation of the participant;

processing, by the simulator engine, the audio data of the participant to determine an attribute of the audio data of the participant at a location of a virtual character in the simulated virtual environment based on a set of attenuation factors, wherein the virtual character is a non-participant simulation character that is computer generated and controlled by an artificial intelligence algorithm;

driving the virtual character in the simulated virtual environment based on the attribute of the audio data of the participant;

receiving, by the simulator engine, three dimensional (3D) motion data of the participant in the capture volume;

determining, by the simulator engine, at least one of a position, an orientation and a velocity of motion of a head of the virtual representation of the participant in the simulated virtual environment based on the 3D motion data of the participant, determining, by the simulator engine, a position, an orientation and/or a velocity of motion of the virtual character's head in the simulated virtual environment;

calculating a vector between coordinates representing the position, the orientation, and/or the velocity of motion of the head of the virtual representation of the participant and coordinates representing the position, the orientation and/or the velocity of motion of the head of the virtual character in the simulated virtual environment,
    wherein a length of the vector represents a distance between the virtual representation of the participant and the virtual character in the simulated virtual environment, and wherein a direction of the vector represents a direction of the virtual representation of the participant respective to the virtual character in the simulated environment; and
determining a number of obstructions in the path of the vector.

2. The method of claim 1, wherein processing the audio data of the participant to determine an attribute of the audio data of the participant at a location of a virtual character in the simulated virtual environment based on a set of attenuation factors, further comprises:
    associating the audio data of the participant in the capture volume to the virtual representation of the participant in the simulated virtual environment,
        wherein the audio data of the participant comprises at least one of a sampled sound corresponding to a sound generated by the participant in the capture volume and a phrase of the participant corresponding to a speech of the participant in the capture volume,
        wherein the at least one of the sound generated by the participant and the speech of the participant is captured through a microphone coupled to the participant, and
        wherein the attribute of the audio data of the participant is an amplitude value of the audio data of the participant;
    determining a peak amplitude value of the audio data of the participant; and
    calculating the amplitude value of the audio data of the participant at the location of the virtual character based on the set of attenuation factors, the set of attenuation factors are determined based on the 3D motion data of the participant,
        wherein the set of attenuation factors comprise at least one of:
            a distance between the virtual representation of the participant and the virtual character in the simulated virtual environment determined, and
            a number of obstructions between the virtual representation of the participant and the virtual character in the simulated virtual environment.

3. The method of claim 1, wherein driving an action of the virtual character in the simulated virtual environment based on the audio data of the participant, further comprises:
    determining if the virtual representation of the participant is communicating with the virtual character when the virtual representation of the participant is outside a field of vision of the virtual character; and
    responsive to determining that the virtual representation of the participant is communicating with the virtual character, triggering a change in an orientation of the virtual character in the simulated virtual environment based on the audio data of the participant.

4. The method of claim 3, wherein triggering the change in the orientation of the virtual character, further comprises:
    changing the orientation of the virtual character such that the virtual character faces the virtual representation of the participant based on the audio data of the participant.

5. The method of claim 1, wherein driving an action of the virtual character in the simulated virtual environment based on the audio data of the participant, further comprises:
    determining if the virtual representation of the participant is communicating with the virtual character when the virtual representation of the participant is in a field of vision of the virtual character; and
    responsive to determining that the virtual representation of the participant is communicating with the virtual character, driving the virtual character to respond to the virtual representation of the participant based on the audio data of the participant.

6. The method of claim 1, further comprises:
    determining an emotional attribute associated with the virtual representation of the participant based on the attribute of the audio data of the participant, wherein the attribute of the audio data of the participant is an amplitude of audio data of the participant; and
    driving the virtual character to respond to the virtual representation of the participant in the simulated virtual environment based on the audio data of the participant and the emotional attribute associated with the virtual representation of the participant.

7. The method of claim 1, wherein driving an action of the virtual character in the simulated virtual environment based on the audio data of the participant, further comprises:
    determining if the audio data of the participant is speech processed;
    responsive to determining that the audio data of the participant is speech processed, retrieving a content of the audio data, wherein the content is a phrase of the participant that corresponds to a speech of the participant in the capture volume;
    mapping the content of the audio data of the participant with a state change definition associated with the virtual character,
        wherein the state definition associated with the virtual character represents a set of instructions associated with the action of the virtual character,
        wherein the set of instructions defines the action of the virtual character specific to the content of the audio data of the participant, and
        wherein the action of the virtual character is a response of the virtual character associated with the content of the audio data of the participant; and
    executing the set of instructions to drive the action of the virtual character based on the content of the audio data of the participant responsive to determining that the audio data of the participant is speech processed.

8. A simulator engine, comprising:
    a position module configured to process 3D motion data of a participant in a capture volume to determine 3D motion data of a virtual representation of the participant in a simulated virtual environment, wherein the position module, further comprises:
        an avatar module configured to determine at least one of a position, an orientation and a velocity of motion of a head of the virtual representation of the participant in the simulated virtual environment based on the 3D motion data of the participant;
        a simulated character module configured to determine 3D motion data of a virtual character in the simulated virtual environment; and
        a vector module configured to calculate a vector between coordinates representing the position and the orientation and/or the velocity of motion of the head of the virtual representation of the participant and coordinates representing the position, the orientation and/or the velocity of motion of the head of the virtual character in the simulated virtual environment, wherein a length of the vector represents a distance between the virtual representation of the participant and the virtual character in the simulated virtual environment, and wherein a direction of the vector represents a direction of the virtual representation of the participant respective to the virtual character in the simulated environment;

a prop module configured to determine a number of obstructions in the path of the vector;

a speech module configured to process audio data of the participant to determine an attribute of the audio data of the participant at a location of the virtual character in the simulated virtual environment based on the 3D motion data of a virtual representation of the participant in a simulated virtual environment, wherein the virtual character is a non-participant simulation character that is computer generated and controlled by an artificial intelligence algorithm; and an artificial intelligence module configured to drive an action of the virtual character in the simulated virtual environment based on the audio data of the participant, when the attribute of the audio data of the participant at the location of the virtual character matches a preset condition.

9. The simulator engine of claim 8, further comprises:
an audio communication module configured to receive the audio data of the participant in the capture volume,
wherein, in a simulated virtual environment, the audio data of the participant is represented as audio data of a virtual representation of the participant; and
a motion capture communication module configured to receive the 3D motion data of the participant.

10. The simulator engine of claim 8, wherein the speech module, further comprises:
a translation module configured to associate the audio data of the participant in the capture volume to the virtual representation of the participant in the simulated virtual environment,
wherein the audio data of the participant comprises at least one of a sampled sound corresponding to a sound generated by the participant in the capture volume and a phrase of the participant corresponding to a speech of the participant in the capture volume,
wherein the at least one of the sound generated by the participant and the speech of the participant is captured through a microphone coupled to the participant, and
wherein the attribute of the audio data of the participant is an amplitude value of the audio data of the participant;
a sampling module configured to determine a peak amplitude value of the audio data of the participant; and
an attenuation module configured to calculate the amplitude value of the audio data of the participant at the location of the virtual character based on the set of attenuation factors, the set of attenuation factors are determined based on the 3D motion data of the participant,
wherein the set of attenuation factors comprise at least one of:
a distance between the virtual representation of the participant and the virtual character in the simulated virtual environment determined, and
a number of obstructions between the virtual representation of the participant and the virtual character in the simulated virtual environment.

11. The simulator engine of claim 8, wherein the artificial intelligence module is configured to determine if the virtual representation of the participant is communicating with the virtual character when the virtual representation of the participant is outside a field of vision of the virtual character.

12. The simulator engine of claim 11:
wherein the artificial intelligence module is configured to trigger a change in the orientation of the virtual character the simulated virtual environment based on the audio data of the participant responsive to determining that the virtual representation of the participant is communicating with the virtual character, and
wherein the artificial intelligence module is configured to change the orientation of the virtual character such that the virtual character faces the virtual representation of the participant based on the audio data of the participant.

13. The simulator engine of claim 8:
wherein the artificial intelligence module is configured to determine if the virtual representation of the participant is communicating with the virtual character when the virtual representation of the participant is in a field of vision of the virtual character, and
wherein the artificial intelligence module is configured to drive the virtual character to respond to the virtual representation of the participant based on the audio data of the participant responsive to determining that the virtual representation of the participant is communicating with the virtual character.

14. The simulator engine of claim 8:
wherein the artificial intelligence module is configured to determine an emotional attribute associated with the virtual representation of the participant based on the attribute of the audio data of the participant, wherein the attribute of the audio data of the participant is an amplitude of audio data of the participant, and
wherein the artificial intelligence module is configured to drive the virtual character to respond to the virtual representation of the participant in the simulated virtual environment based on the audio data of the participant and the emotional attribute associated with the virtual representation of the participant.

15. The simulator engine of claim 8:
wherein the artificial intelligence module is configured to determine if the audio data of the participant is speech processed,
wherein the artificial intelligence module is configured to retrieve a content of the audio data responsive to determining that the audio data of the participant is speech processed, wherein the content is a phrase of the participant that corresponds to a speech of the participant in the capture volume,
wherein the artificial intelligence module is configured to map the content of the audio data of the participant with a state change definition associated with the virtual character,
wherein the state definition associated with the virtual character represents a set of instructions associated with the action of the virtual character,
wherein the set of instructions defines the action of the virtual character specific to the content of the audio data of the participant,
wherein the action of the virtual character is a response of the virtual character associated with the content of the audio data of the participant, and
wherein the artificial intelligence module is configured to execute the set of instructions to drive the action of the virtual character based on the content of the audio data of the participant responsive to determining that the audio data is speech processed.

16. A system, comprising:
a motion capture device configured to capture a motion of a participant in a capture volume;
a tracking device configured to transmit 3D motion data of the participant in the capture volume;
a wearable computing device configured to transmit audio data of the participant; and
a simulator engine communicatively coupled to at least one of the motion capture device, the tracking device and the wearable computing device, the simulator engine is configured to:
receive the 3D motion data from the tracking device;
receive the audio data of the participant from the wearable computing device over a communication link between the simulator engine and the wearable computing device, wherein, in a simulated virtual environment, the audio data of the participant is represented as audio data of a virtual representation of the participant;
process the 3D motion data of the participant to determine 3D motion data of the virtual representation of the participant in the simulated virtual environment;
process the audio data of the participant to determine an attribute of the audio data of the participant at a location of a virtual character in the simulated virtual environment based on a set of attenuation factors, wherein the virtual character is a non-participant simulation character that is computer generated and controlled by an artificial intelligence algorithm;
drive an action of the virtual character in the simulated virtual environment based on the audio data of the participant, when the attribute of the audio data of the participant at the location of the virtual character matches a preset condition;
determine at least one of a position, an orientation and a velocity of motion of a head of the virtual representation of the participant in the simulated virtual environment based on the 3D motion data of the participant,
determine 3D motion data of the virtual character in the simulated virtual environment,
calculate a vector between coordinates representing the position, the orientation and/or the velocity of motion of the head of the virtual representation of the participant and coordinates representing the position, the orientation and/or the velocity of motion of the head of the virtual character in the simulated virtual environment,
wherein a length of the vector represents a distance between the virtual representation of the participant and the virtual character in the simulated virtual environment, and wherein a direction of the vector represents a direction of the virtual representation of the participant respective to the virtual character in the simulated environment; and
determine a number of obstructions in the path of the vector.

17. The system of claim 16, wherein the wearable computing device, further comprising:
a speech library module comprising a plurality of phrases;
a microphone to capture at least one of a sound generated by the participant and a speech of the participant, the microphone to transmit at least one of the sound and the speech as a microphone data;
a sound card module to sample the microphone data received from the microphone to generate the audio data;
a speech recognition module to analyze the microphone data received from the microphone to determine if the microphone data matches at least one phrase of the plurality of phrases in the speech library module, at least one of the phrase from the speech library module that matches the microphone data and the sampled microphone data from the sound card module comprise the audio data; and
a transceiver module to transmit the audio data.

18. The system of claim 16, wherein the simulator engine is further configured to:
associate the audio data of the participant in the capture volume to the virtual representation of the participant in the simulated virtual environment,
wherein the audio data of the participant comprises at least one of a sampled sound corresponding to a sound generated by the participant in the capture volume and a phrase of the participant corresponding to a speech of the participant in the capture volume,
wherein the at least one of the sound generated by the participant and the speech of the participant is captured through a microphone coupled to the participant, and
wherein the attribute of the audio data of the participant is an amplitude value of the audio data of the participant;
determine a peak amplitude value of the audio data of the participant;
calculate the amplitude value of the audio data of the participant at the location of the virtual character based on the set of attenuation factors, the set of attenuation factors are determined based on the 3D motion data of the participant,
wherein the set of attenuation factors comprise at least one of:
a distance between the virtual representation of the participant and the virtual character in the simulated virtual environment determined, and
a number of obstructions between the virtual representation of the participant and the virtual character in the simulated virtual environment;
determine if the audio data of the participant is speech processed; and
drive the virtual character to respond to the virtual representation of the participant in the simulated virtual environment based on the content of the audio data responsive to determining that the audio data is speech processed.

19. A method, comprising:
receiving, by a simulator engine, audio data of a participant in a capture volume;
receiving, by the simulator engine, three dimensional (3D) motion data of the participant in the capture volume;
processing, by the simulator engine, the audio data of the participant to determine an attribute of the audio data of the participant at a location of a virtual character in a simulated virtual environment based on the 3D motion data of the participant in the capture volume, wherein the virtual character is a non-participant simulation character that is computer generated and controlled by an artificial intelligence algorithm;

probabilistically driving a change of state of the virtual character in the simulated virtual environment based on the attribute of the audio data of the participant and at least one of:
- a current state of the virtual character, and
- a current state of the simulated virtual environment determining, by the simulator engine, at least one of a position, an orientation and a velocity of motion of a head of the virtual representation of the participant in the simulated virtual environment based on the 3D motion data of the participant, determining, by the simulator engine, 3D motion data of the virtual character in the simulated virtual environment, wherein the 3D motion data of the virtual character comprises a position, an orientation and/or a velocity of motion of the virtual character's head in the simulated virtual environment;

calculating a vector between coordinates representing the position and the orientation and/or the velocity of motion of the head of the virtual representation of the participant and coordinates representing the position, the orientation and/or the velocity of motion of the head of the virtual character in the simulated virtual environment,
- wherein a length of the vector represents a distance between the virtual representation of the participant and the virtual character in the simulated virtual environment, and wherein a direction of the vector represents a direction of the virtual representation of the participant respective to the virtual character in the simulated environment; and determining a number of obstructions in the path of the vector.

20. The method of claim 19, further comprising: processing, by the simulator engine, the audio data of the participant to determine an attribute of the audio data of the participant at a location of the virtual representation of the participant based on the 3D motion data of the participant in the capture volume.

21. The method of claim 19, further comprises:
associating the audio data of the participant in the capture volume to the virtual representation of the participant in the simulated virtual environment,
- wherein the audio data of the participant comprises at least one of:
  - a sampled sound corresponding to a sound generated by the participant in the capture volume;
  - a semantic interpretation of the sound; and
  - an audio quality of the sound.

22. The method of claim 19:
wherein an attribute of the audio data includes the intent of the virtual representation of the participant and at least one of an audio characteristic of the sound, a source of the sound and a recipient of the sound,
wherein the audio characteristic of the sound includes at least one of an amplitude of the sound, a frequency of the sound and a tone of the sound,
wherein the current state of the simulated virtual environment comprises a current state of at least one of another virtual character and virtual representation of another participant, and
wherein the current state of the simulated virtual environment comprises a position and orientation of inanimate objects in the simulated virtual environment.

23. The method of claim 19, wherein processing the audio data of the participant to determine an attribute of the audio data of the participant at a location of a virtual character in the simulated virtual environment based on the 3D motion data of the participant in the capture volume, further comprises:
determining an intent of the virtual representation of the participant based on the semantic interpretation of the sound;
determining a peak amplitude value of the audio data of the participant; and
calculating an amplitude value of the audio data of the participant at the location of the virtual character based on a set of attenuation factors, the set of attenuation factors are determined based on the 3D motion data of the participant,
- wherein the set of attenuation factors comprise at least one of:
  - a distance between the virtual representation of the participant and the virtual character in the simulated virtual environment determined, and
  - a number of obstructions between the virtual representation of the participant and the virtual character in the simulated virtual environment.

24. The method of claim 19, probabilistically driving a change of state of the virtual character in the simulated virtual environment based on the current state of the virtual character and the attribute of the audio data of the participant, further comprises:
determining if the audio data of the participant is speech processed;
determining the intent of the virtual representation of the participant based on the audio data responsive to determining that the audio data of the participant is speech processed;
determining the quality of the sound based on the audio data of the participant;
determining whether the virtual character in simulated virtual environment can perceive the audio data of the participant based on the quality of the sound and the attribute of the audio data; and
mapping the intent of the virtual representation of the participant with a state change definition of a plurality of state change definitions associated with the virtual character based on at least one of the current state of the virtual character, the current state of the simulated virtual environment, a probability value associated with the change in state, and the attribute of the audio data,
- wherein the state change definition associated with the virtual character represents a set of instructions that defines a response of the virtual character, and
- wherein the response of the virtual character comprises at least one of an action of the virtual character, a behavior of the virtual character executing the set of instructions to drive the change of state of the virtual character.

25. A method, comprising:
receiving, by a simulator engine, audio data of a participant in a capture volume, wherein, in a simulated virtual environment, the audio data of the participant is represented as audio data of a virtual representation of the participant;
processing, by the simulator engine, the audio data of the participant to determine an attribute of the audio data of the participant at a location of a virtual character in the simulated virtual environment based on a set of attenuation factors, wherein the virtual character is a non-participant simulation character that is computer generated and controlled by an artificial intelligence algorithm; and driving the virtual character in the simulated virtual environment based on the attribute of the audio data of the participant, wherein driving the action of the virtual character in the simulated virtual environment based on the audio data of the participant comprises:
  determining if the virtual representation of the participant is communicating with the virtual character when the virtual representation of the participant is outside a field of vision of the virtual character; and
  responsive to determining that the virtual representation of the participant is communicating with the virtual character, triggering a change in an orientation of the virtual character in the simulated virtual environment based on the audio data of the participant.

26. A simulator engine, comprising:

a position module configured to process 3D motion data of a participant in a capture volume to determine 3D motion data of a virtual representation of the participant in a simulated virtual environment;

a speech module configured to process audio data of the participant to determine an attribute of the audio data of the participant at a location of the virtual character in the simulated virtual environment based on the 3D motion data of a virtual representation of the participant in a simulated virtual environment, wherein the virtual character is a non-participant simulation character that is computer generated and controlled by an artificial intelligence algorithm; and an artificial intelligence module configured to:
  drive an action of the virtual character in the simulated virtual environment based on the audio data of the participant, when the attribute of the audio data of the participant at the location of the virtual character matches a preset condition, and
  determine if the virtual representation of the participant is communicating with the virtual character when the virtual representation of the participant is outside a field of vision of the virtual character.

* * * * *